US012666373B2

(12) United States Patent
Matsumura et al.

(10) Patent No.: US 12,666,373 B2
(45) Date of Patent: Jun. 23, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 324 days.

(21) Appl. No.: 18/558,307

(22) PCT Filed: May 11, 2021

(86) PCT No.: PCT/JP2021/017948
§ 371 (c)(1),
(2) Date: Oct. 31, 2023

(87) PCT Pub. No.: WO2022/239133
PCT Pub. Date: Nov. 17, 2022

(65) Prior Publication Data
US 2024/0224200 A1    Jul. 4, 2024

(51) Int. Cl.
*H04W 52/36*       (2009.01)
*H04L 5/00*        (2006.01)
*H04W 72/1268*     (2023.01)
*H04W 80/02*       (2009.01)

(52) U.S. Cl.
CPC ......... *H04W 52/365* (2013.01); *H04L 5/0051* (2013.01); *H04W 72/1268* (2013.01); *H04W 80/02* (2013.01)

(58) Field of Classification Search
CPC ........... H04W 52/365; H04W 72/1268; H04W 80/02; H04W 52/30; H04W 52/36; H04L 5/0051
See application file for complete search history.

(56) References Cited

U.S. PATENT DOCUMENTS

2024/0179640 A1* 5/2024 Liu ........................ H04L 5/0048

FOREIGN PATENT DOCUMENTS

WO       2020-030147 A1    2/2020

OTHER PUBLICATIONS

Office Action issued in Japanese Patent Application No. 2023-520645, issued May 13, 2025 (7 pages).
(Continued)

*Primary Examiner* — Eric Myers
(74) *Attorney, Agent, or Firm* — Osha Bergman Watanabe & Burton LLP

(57) ABSTRACT

A terminal according to one aspect of the present disclosure includes a control section that, when transmission of a Power Headroom Report (PHR) Medium Access Control (MAC) control element in a certain serving cell and Physical Uplink Shared Channel (PUSCH) repetition transmission using a plurality of sounding reference signal resource indicators (SRIs) in another serving cell temporally overlap, determines one or two PHRs regarding the other serving cell to be included in the PHR MAC control element, and a transmitting section that transmits the PHR MAC control element. According to one aspect of the present disclosure, the PHR report when MTRP PUSCH repetition is used can be appropriately performed.

5 Claims, 19 Drawing Sheets

(56) References Cited

OTHER PUBLICATIONS

3GPP TSG RAN WG1 Meeting #104b-e; R1-2102661; ZTE; "Multi-TRP enhancements for PDCCH, PUCCH and PUSCH"; e-Meeting, Apr. 12-20, 2021 (28 pages).
3GPP TS 38.321 V16.4.0; "3rd Generation Partnership Project; Technical Specification Group Radio Access Network; NR; Medium Access Control (MAC) protocol specification; (Release 16)" pp. 116-118; Mar. 2021 (5 pages).
Office Action issued in Japanese Patent Application No. 2023-520645, dated Jan. 28, 2025 (4 pages).
3GPP TSG RAN WG1 Meeting #104bis-e; R1-2104138; Ad-hoc chair (Samsung); Session notes for 8.1 (Further enhancements on MIMO for NR); e-Meeting, Apr. 12-20, 2021 (21 pages).
International Search Report issued in PCT/JP2021/017948 on Dec. 21, 2021 (5 pages).
Written Opinion of the International Searching Authority issued in PCT/JP2021/017948 on Dec. 21, 2021 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

Figure 2:
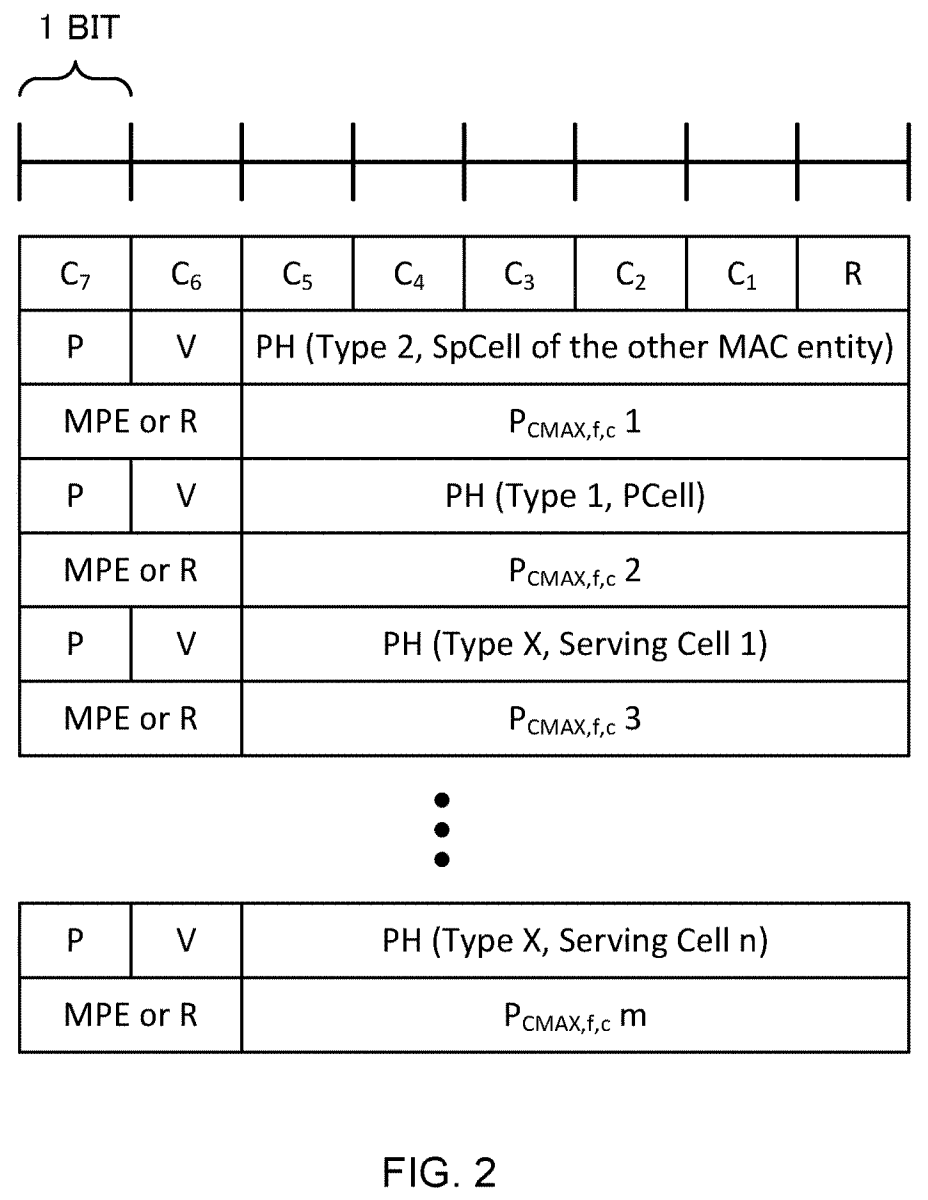

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |

• • •

| P | V | PH (Type X, Serving Cell n) |
|---|---|---|
| MPE or R | | $P_{CMAX,f,c}$ m |

1 BIT

| $C_7$ | $C_6$ | $C_5$ | $C_4$ | $C_3$ | $C_2$ | $C_1$ | $C_0$ |
|---|---|---|---|---|---|---|---|
| $X_7$ | $X_6$ | $X_5$ | $X_4$ | $X_3$ | $X_2$ | $X_1$ | $X_0$ |
| P | V | | | PHR_1,1 | | | |
| R | R | | | PHR_1,2 | | | |
| MPE or R | | | | $P_{CMAX,f,c}$ 1 | | | |

● ● ●

| P | V |
| R | R |
| PHR_m,1 |
| PHR_m,2 |
| MPE or R |
| $P_{CMAX,f,c}$ m |

FIG. 4B

| $C_7$ | $C_6$ | $C_5$ | $C_4$ | $C_3$ | $C_2$ | $C_1$ | $C_0$ |
|---|---|---|---|---|---|---|---|
| P | V | | | PHR_1,1 | | | |
| R | R | | | PHR_1,2 | | | |
| MPE or R | | | | $P_{CMAX,f,c}$ 1 | | | |

● ● ●

| P | V |
| R | R |
| PHR_m,1 |
| PHR_m,2 |
| MPE or R |
| $P_{CMAX,f,c}$ m |

FIG. 4C

| $C_7$ | $C_6$ | $C_5$ | $C_4$ | $C_3$ | $C_2$ | $C_1$ | $C_0$ |
|---|---|---|---|---|---|---|---|
| P | V | | | PHR_1,1 | | | |
| R | V | | | PHR_1,2 | | | |
| MPE or R | | | | $P_{CMAX,f,c}$ 1 | | | |

● ● ●

| P | V |
| R | V |
| PHR_m,1 |
| PHR_m,2 |
| MPE or R |
| $P_{CMAX,f,c}$ m |

| $C_0$ | $C_1$ | $C_2$ | $C_3$ | $C_4$ | $C_5$ | $C_6$ | $C_7$ |
|---|---|---|---|---|---|---|---|
| PHR_1,1 | | | | | | V | P |
| PHR_1,2 | | | | | | R | R |
| $P_{CMAX,f,c}$ 1 | | | | | | MPE or R | |

| PHR_m,1 | | V | P |
|---|---|---|---|
| PHR_m,2 | | R | R |
| $P_{CMAX,f,c}$ m | | MPE or R | |

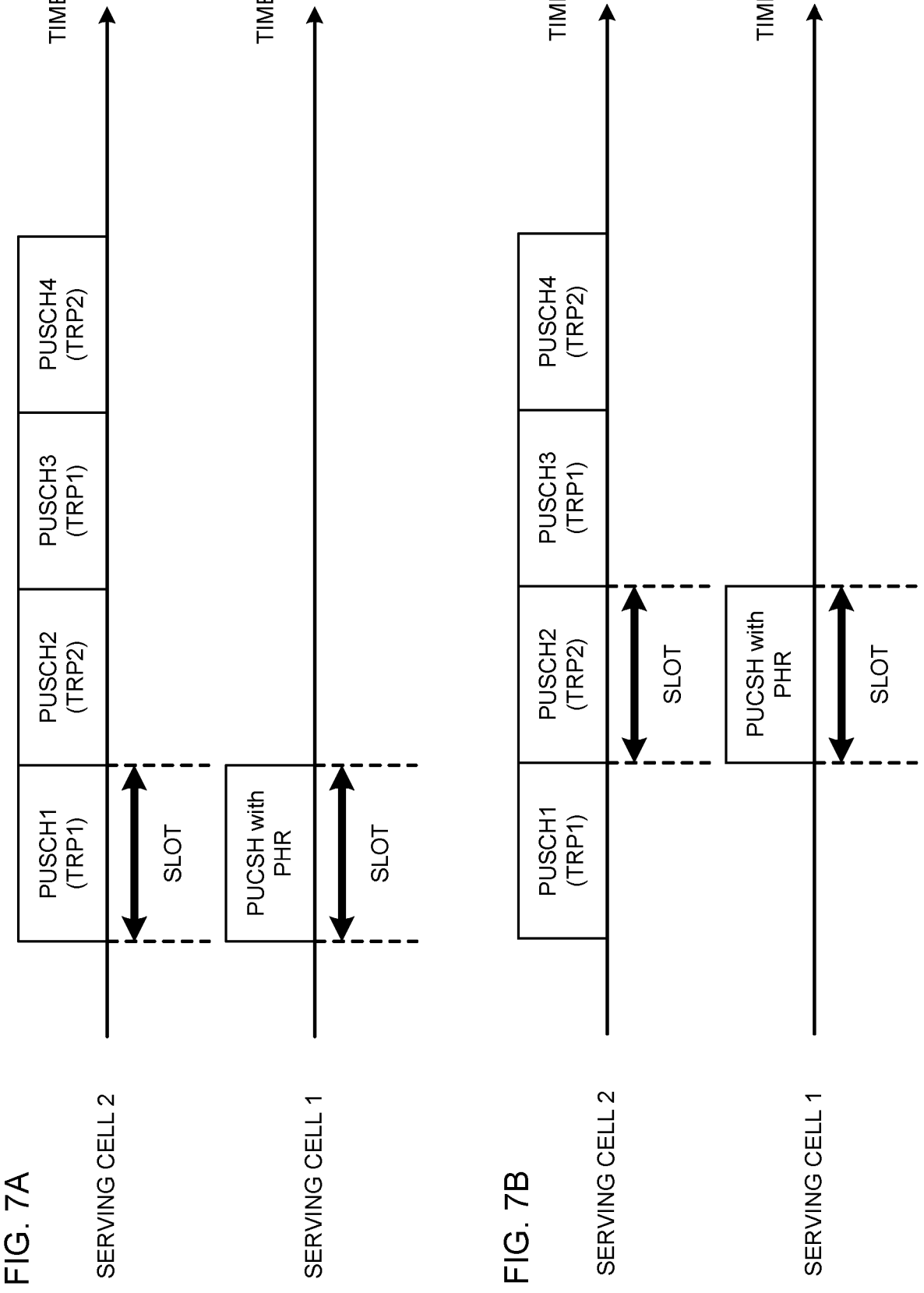

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a user terminal (User Equipment (UE)) transmits a PH report (Power Headroom Report (PHR)) including information of power headroom (PH) for each serving cell to a network. The network can use the PHR for control of uplink transmission power of the UE.

In NR, a scheme in which one or a plurality of transmission/reception points (TRPs) (multi-TRP (Multi TRP (MTRP))) perform DL transmission to the UE has been under study. A scheme in which the UE performs UL transmission to one or a plurality of TRPs has been under study.

In future radio systems (for example, NR of Rel. 17 or later versions), Physical Uplink Shared Channel (PUSCH) repetition transmission of MTRP has been under study.

However, the current standards do not assume how to control the PHR regarding MTRP PUSCH repetition. Unless appropriate triggering/generation/transmission of the PHR is performed, communication throughput, communication quality, and the like may be deteriorated.

In view of this, the present disclosure has one object to provide a terminal, a radio communication method, and a base station that can appropriately perform a PHR report when MTRP PUSCH repetition is used.

Solution to Problem

A terminal according to one aspect of the present disclosure includes a control section that, when transmission of a Power Headroom Report (PHR) Medium Access Control (MAC) control element in a certain serving cell and Physical Uplink Shared Channel (PUSCH) repetition transmission using a plurality of sounding reference signal resource indicators (SRIs) in another serving cell temporally overlap, determines one or two PHRs regarding the other serving cell to be included in the PHR MAC control element, and a transmitting section that transmits the PHR MAC control element.

Advantageous Effects of Invention

According to one aspect of the present disclosure, the PHR report when MTRP PUSCH repetition is used can be appropriately performed.

BRIEF DESCRIPTION OF DRAWINGS

FIG. 2 is a diagram to show an example of a multiple entry PHR MAC CE in Rel-16 NR.

FIGS. 4A to 4C are diagrams to show examples of the multiple entry PHR MAC CE in the first embodiment.

FIGS. 7A and 7B are diagrams to show examples of case A of Embodiment 3.1.

FIGS. 11A and 11B are diagrams to show examples of case A of Embodiment 3.2a.

DESCRIPTION OF EMBODIMENTS (PHR)

In future radio communication systems (for example, NR), a UE transmits a PH report (Power Headroom Report (PHR)) including information of power headroom (PH) for each serving cell to a network. The network can use the PHR for control of uplink transmission power of the UE.

The PHR may be transmitted by MAC (Medium Access Control) signaling, using a PUSCH (Physical Uplink Shared Channel). For example, the PHR is notified using a PHR MAC CE (Control Element) included in a MAC PDU (Protocol Data Unit).

In NR, a single entry PHR MAC CE related to a primary cell (PCell) is supported.

Figure 1:
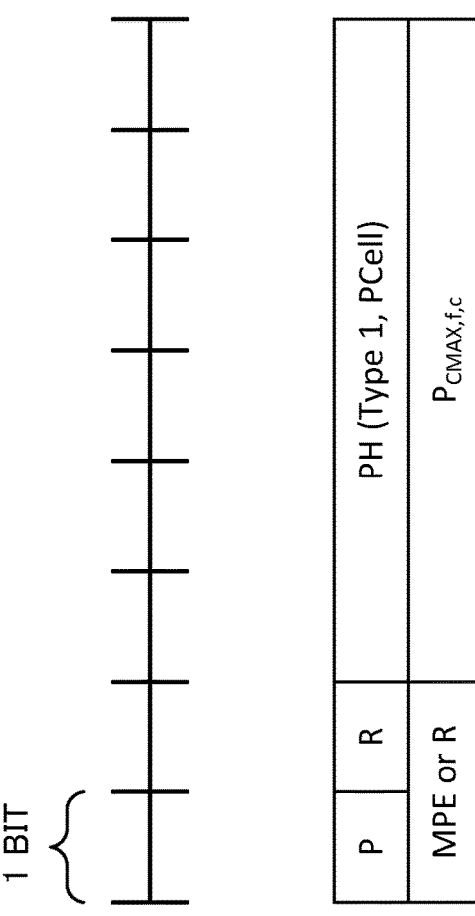
FIG. 1 is a diagram to show an example of a single entry PHR MAC CE in Rel-16 NR.

FIG. 1 is a diagram to show an example of the single entry PHR MAC CE in Rel-16 NR. The MAC CE includes two octets (=16 bits). Each 'R' of FIG. 1 indicates a reserved field of 1 bit, and is set to a value of '0', for example.

'PH (Type 1, PCell)' of FIG. 1 indicates a field of 6 bits, and indicates an index related to type 1 PH of a primary cell (PCell). The index related to PH is associated with a specific PH value (decibel (dB) unit) (or level).

Note that, for example, type 1 PH may be PH when a PUSCH is taken into consideration (for example, only power of the PUSCH is taken into consideration), type 2 PH may be PH when a PUCCH is taken into consideration (for example, power of both of the PUSCH and the PUCCH is taken into consideration), and type 3 PH may be PH when a sounding reference signal (SRS) is taken into consideration (for example, power of the PUSCH and the SRS is taken into consideration).

'$P_{CMAX,f,c}$' of FIG. 1 indicates a field of 6 bits, and indicates an index related to $P_{CMAX,f,c}$ used for calculation of the PH field. The index related to $P_{CMAX,f,c}$ is associated with a specific UE transmission power level (dB). Note that $P_{CMAX,f,c}$ may be referred to as maximum configured transmission power (maximum permitted transmission power) of the UE for a serving cell c of a carrier f. $P_{CMAX,f,c}$ is hereinafter also simply referred to as $P_{CMAX}$.

'P' of FIG. 1 may be a field related to power management maximum power reduction (P-MPR or maximum permitted UE output power reduction) regarding the serving cell c, or may be a field related to maximum permissible exposure (Maximum Permitted Exposure (MPE)). 'MPE' of FIG. 1 may be a field related to MPE. The fields such as 'P' and 'MPE' may each be interpreted as an 'R' field, depending on configuration using higher layer signaling for the UE.

In NR, a multiple entry PHR MAC CE including a plurality of pieces of data similar to the single entry (two octets) described above is also supported. The multiple entry PHR MAC CE may include a PH field for a primary secondary cell (PSCell) and a secondary cell (SCell) or the like. Note that the PCell and the PSCell may each be referred to as a special cell (SpCell).

FIG. 2 is a diagram to show an example of the multiple entry PHR MAC CE in Rel-16 NR. Fields similar to those of FIG. 1 will not be repeatedly described. Each field of 6 bits including the term 'PH' of FIG. 2 indicates a PH field for its corresponding type (for example, types 1 to 3 described above) and cell.

Note that presence of a type 2 PH field for the SpCell of the other MAC entity may be configured by a higher layer parameter phr-Type2OtherCell being true.

Each field of 6 bits including the term '$P_{CMAX,c}$' of FIG. 2 is a $P_{CMAX,c}$ field indicating $P_{CMAX,c}$ used for calculation of its immediately preceding PH field. '$C_i$' of FIG. 2 is a field indicating whether or not a PH field of a serving cell corresponding to serving cell index i is included in the PHR. Note that FIG. 2 shows a case in which the maximum serving cell index is smaller than 8. When the maximum serving cell index is equal to or greater than 8, fields of '$C_i$' that can indicate serving cells of i=31, for example, may be included in the MAC CE.

Note that the number attached to the "serving cell" of the PH field and the number attached to the $P_{CMAX,c}$ field need not represent the serving cell index, and may simply represent a value of the ordinal number thereof included in the MAC CE.

'V' of FIG. 2 is a field indicating whether a value of PH corresponding to its immediately following PH field is based on actual transmission (real transmission) (V=0) or is based on a reference format (V=1). PH based on a reference format may be referred to as a virtual PH. Note that, when V=1, its corresponding '$P_{CMAX,c}$' field, 'MPE' field, and the like may be omitted.

The network may transmit PHR configuration information related to a condition of triggering the PHR to the UE. Here, examples of the PHR configuration information include a prohibit timer, a periodic timer, a threshold of a change of path loss, and the like. Higher layer signaling may be used for notification thereof. When a PHR trigger condition is satisfied, the UE triggers the PHR.

Note that, in the present disclosure, the higher layer signaling may be, for example, any one or combinations of Radio Resource Control (RRC) signaling, Medium Access Control (MAC) signaling, broadcast information, and the like.

As the MAC signaling, for example, a MAC control element (MAC CE), a MAC Protocol Data Unit (PDU), or the like may be used. The broadcast information may be, for example, a master information block (MIB), a system information block (SIB), minimum system information (Remaining Minimum System Information (RMSI)), other system information (OSI), or the like.

(Multi-TRP)

In NR, a scheme in which one or a plurality of transmission/reception points (TRPs) (multi-TRP (M-TRP)) perform DL transmission to the UE by using one or a plurality of panels (multi-panel) has been under study. A scheme in which the UE performs UL transmission to one or a plurality of TRPs has been under study.

Incidentally, in future radio systems (for example, NR of Rel. 17 or later versions), indication of a plurality of (for example, two) SRS resource indicators (SRIs)/transmitted precoding matrix indicators (TPMIs) by using a single DCI for performing PUSCH repetition transmission of a plurality of TRPs (MTRP PUSCH repetition) has been under study.

For example, in a case of codebook-based transmission, the UE may determine a precoder for PUSCH transmission, based on the SRI, a transmitted rank indicator (TRI), and the TPMI. In a case of non-codebook-based transmission, the UE may determine a precoder for PUSCH transmission, based on the SRI. Note that the SRI may be indicated for the UE by DCI, or may be given by a higher layer parameter.

When a single DCI indicates a plurality of SRIs/TPMIs, the following option 1 or option 2 may be considered;

Option 1: SRIs/TPMIs (values) for a plurality of (for example, two) TRPs are indicated using fields indicating a plurality of (for example, two) SRIs/TPMIs, Option 2: A field indicating one SRI/TPMI is indicated, and code points corresponding to values of a plurality of (for example, two) SRIs/TPMIs are configured for the field indicating the SRI/TPMI.

In option 1, the respective code points of the plurality of SRI/TPMI fields may correspond to a value of one TPMI. Correspondence (association) between the SRI/TPMI field and the value of the SRI/TPMI may be defined in a specification in advance. For the correspondence (association) between the SRI/TPMI field and the value of the SRI/TPMI, correspondence defined in Rel. 16 or earlier versions may be used, or correspondence defined in Rel. 17 or later versions may be used. The correspondence between the SRI/TPMI field and the value of the SRI/TPMI may be different for each of the plurality of SRI/TPMI fields.

In option 2, a code point for which one SRI/TPMI field is indicated may correspond to the values of the plurality of (for example, two) SRIs/TPMIs. Correspondence (association) between the SRI/TPMI field and the value of the SRI/TPMI may be defined in a specification in advance, or may be notified/configured/activated by RRC signaling/MAC CE.

Note that dynamic indication/switch of PUSCH repetition transmission using a single PUSCH transmission/single TRP (STRP) and PUSCH repetition transmission using a plurality of TRPs (Multi TRP (MTRP)) using DCI has been under study. For the dynamic switch, a specific field included in DCI defined in Rel. 16 or earlier versions may be used, or a specific field (for example, a field for indicating STRP or MTRP operation) defined in Rel. 17 or later versions may be used.

"Dynamic switch" in the present disclosure may mean "switching using at least one of higher layer signaling and physical layer signaling". "Switch" in the present disclosure may be interchangeably interpreted as switching, change, changing, application, indication, configuration, or the like.

Incidentally, the current standards do not assume how to control the PHR regarding MTRP PUSCH repetition. Unless appropriate triggering/generation/transmission of the PHR is performed, communication throughput, communication quality, and the like may be deteriorated.

In view of this, the inventors of the present invention came up with the idea of a method for appropriately performing a PHR report when MTRP PUSCH repetition is used.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted.

In the present disclosure, activate, deactivate, indicate, select, configure, update, determine, and the like may be interchangeably interpreted.

In the present disclosure, RRC, an RRC parameter, an RRC message, RRC signaling, a higher layer parameter, an information element (IE), and configuration may be interchangeably interpreted. In the present disclosure, a MAC CE, an update command, and an activation/deactivation command may be interchangeably interpreted. In the present disclosure, "support," "control," "controllable," "operate," and "operable" may be interchangeably interpreted.

In the present disclosure, a panel, a beam, a panel group, a beam group, a precoder, an Uplink (UL) transmission entity, a TRP, spatial relation information (SRI), a spatial relation, an SRS resource indicator (SRI), an SRS resource, a control resource set (CORESET), a Physical Downlink Shared Channel (PDSCH), a code word, a base station, a certain antenna port (for example, a demodulation reference signal (DMRS) port), a certain antenna port group (for example, a DMRS port group), a certain group (for example, a code division multiplexing (CDM) group, a certain reference signal group, a CORESET group), a certain resource (for example, a certain reference signal resource), a certain resource set (for example, a certain reference signal resource set), a CORESET pool, a PUCCH group (PUCCH resource group), a spatial relation group, a downlink TCI state (DL TCI state), an uplink TCI state (UL TCI state), a unified TCI state, a common TCI state, QCL, a QCL assumption, and the like may be interchangeably interpreted.

A TCI state Identifier (ID) and a TCI state may be interchangeably interpreted. A TCI state and a TCI may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the present disclosure, a TRP index, a CORESET pool index (CORESETPoolIndex), a pool index, a group index, and the like may be interchangeably interpreted.

In the present disclosure, a single PDCCH (DCI) may be referred to as a PDCCH (DCI) of a first scheduling type (for example, scheduling type A (or type 1)). A multi-PDCCH (DCI) may be referred to as a PDCCH (DCI) of a second scheduling type (for example, scheduling type B (or type 2)).

In the present disclosure, regarding the single DCI, an i-th TRP (TRP #i) may mean an i-th TCI state, an i-th CDM group, or the like (i is an integer). Regarding the multi-DCI, an i-th TRP (TRP #i) may mean a CORESET corresponding to CORESET pool index=i, an i-th TCI state, an i-th CDM group, or the like (i is an integer).

In the present disclosure, a multi-TRP (MTRP, M-TRP), a multi-TRP system, multi-TRP transmission, and a multi-PDSCH may be interchangeably interpreted.

In the present disclosure, a single DCI (sDCI), a single PDCCH, a multi-TRP system based on a single DCI, an sDCI-based MTRP, scheduling of a plurality of PUSCHs (corresponding to different SRIs) using one DCI, sDCI-based MTRP transmission, and activation of two TCI states on at least one TCI code point may be interchangeably interpreted.

In the present disclosure, a multi-DCI (mDCI), a multi-PDCCH, a multi-TRP system based on a multi-DCI, an mDCI-based MTRP, mDCI-based MTRP transmission, use of a multi-DCI for the MTRP, scheduling of a plurality of PUSCHs (corresponding to different SRIs) using two DCIs, and configuration of two CORESET pool indexes or CORESET pool index=1 (or a value of 1 or greater) may be interchangeably interpreted.

Repetitions of the present disclosure may be interchangeably interpreted as MTRP-based repetitions, repetitions of Rel. 17, repetitions applying different spatial relations, repetition PUSCHs, repetition PUCCHs, repetition transmissions, or the like. Repetition transmission in the following embodiments may correspond to at least one of repetition transmission type A, repetition transmission type B, and another repetition transmission type.

Note that, in the repetition PUSCHs, the same code word/transport block may be transmitted in each PUSCH (each repetition). The repetition PUSCHs may be interchangeably interpreted as a plurality of PUSCHs having the same contents (for example, data/code word/transport block).

In the present disclosure, a first TRP and a second TRP may be interchangeably interpreted as a first PUSCH and a second PUSCH, a first PUSCH transmission occasion and a second PUSCH transmission occasion, a first SRI and a second SRI, or the like.

MTRP PUSCH repetitions in the present disclosure may be interchangeably interpreted as two PUCCH repetitions to two TRPs, two PUSCH repetitions using two SRIs, two PUSCH repetitions using a set of two power control parameters (the power control parameters will be described later), or the like.

In the present disclosure, STRP PUSCH repetitions may mean repetition transmissions of a plurality of PUSCHs transmitted using one (same) SRI/power control parameter set/beam/precoder. Note that a single transmission may mean a PUSCH transmission transmitted using one SRI/power control parameter set/beam/precoder.

Note that PUSCH repetition/PUSCH transmission to TRP1 may mean PUSCH repetition/PUSCH transmission using a first SRI (or SRI field)/first power control parameter set.

PUSCH repetition/PUSCH transmission to TRP2 may mean PUSCH repetition/PUSCH transmission using a second SRI (or SRI field)/second power control parameter set.

PUSCH repetition transmission using a plurality of TRPs in the following embodiments may be interchangeably interpreted as MTRP PUSCH repetition, PUSCH transmission using a plurality of TRPs, PUSCH repetition transmission for a plurality of TRPs, PUSCHs over a plurality of TRPs, repetition PUSCHs over a plurality of TRPs, simply repetition PUSCHs, repetition transmission, a plurality of PUSCH transmissions, PUSCH transmission using a plurality of SRIs, or the like.

PUSCH transmission using a single TRP may be referred to as STRP PUSCH repetition, PUSCH transmission using a single TRP, PUSCH repetition transmission for a single TRP, a PUSCH over a single TRP, a repetition PUSCH over a single TRP, a single PUSCH transmission for a single TRP, simply a single PUSCH transmission, PUSCH transmission in a single TRP, PUSCH transmission using a single SRI, or the like.

Note that, in each embodiment of the present disclosure, description will take examples of PUSCH transmission for a single/plurality of TRP (s) using one DCI and codebook-based PUSCH transmission as UL transmission but may be applied to non-codebook-based PUSCH transmission, and PUSCH transmission to which each embodiment can be applied is not limited to these. When each embodiment of the present disclosure is applied to non-codebook-based PUSCH transmission, one or more SRS resources (SRIs) may be indicated for the UE by respective SRI fields. A common or different embodiment (s) may be applied to codebook-based PUSCH transmission and non-codebook-based PUSCH transmission. UL transmission is not limited to the PUSCH, and each embodiment of the present disclosure can also be applied to the PUCCH as appropriate (the PUSCH may be interpreted as the PUCCH).

In each embodiment of the present disclosure, a case in which the numbers of the plurality of TRPs, the plurality of SRIs, and the like are two will be described as a main example. However, these numbers may be three or more. In other words, "two" in the present disclosure may be interpreted as "a plurality".

Note that, in the present disclosure, "configuration to CORESET pool index=0" may be interchangeably interpreted as "configuration to CORESET pool index=0 or no configuration of the CORESET pool index".

In the present disclosure, a CORESET pool index, a PUSCH repetition index, and a higher layer index may be interchangeably interpreted.

In the present disclosure, "PHR" may be interchangeably interpreted as "PH", a "PH field", a "PH value", or the like.

Note that each embodiment to be described below presupposes a case in which MTRP PUSCH repetition is enabled for the UE by a higher layer parameter, but this is not restrictive.

(Radio Communication Method)

First Embodiment

A first embodiment relates to a PHR report including at least one type 1 PHR (which may be referred to as an actual PHR, a real PHR, or the like) based on actual PUSCH transmission.

The first embodiment may be applied in a case in which STRP PUSCH repetition regarding a certain serving cell or single transmission (that is, PUSCH transmission without repetition) is indicated by DCI. In the following, in the present disclosure, this case is also referred to as "case 1". A case in which MTRP PUSCH repetition is indicated by DCI regarding a certain serving cell is also referred to as "case 2".

Note that a case in which STRP PUSCH repetition is indicated by DCI regarding a certain serving cell is also referred to as "case 1a", and a case in which single transmission is indicated by DCI regarding a certain serving cell is also referred to as "case 1b". Case 1 includes cases 1a and 1b. "Case 1" of the present disclosure may be interchangeably interpreted as "case 1a/case 1b".

Note that, in the first embodiment, "to report one/two PHR (s)" may mean "to report one/two PHR (s) regarding a serving cell for which STRP PUSCH repetition/single transmission/MTRP PUSCH repetition is indicated by DCI". Note that, in the present disclosure, such one/two PHR (s) to be reported may be of type 1 PH, or may be PH of another type.

The first embodiment is broadly divided into Embodiment 1.1 in which the UE reports one PHR in case 1 and Embodiment 1.2 in which the UE reports two PHRs in case 1.

Embodiment 1.1

In Embodiment 1.1, one PHR to be reported in case 1 may be calculated based on actual PUSCH transmission, using a method similar to that already defined in Rel-15/16 NR.

In Embodiment 1.1, in case 2, the UE may report two PHRs. Note that, in case 2, the UE may report one or two PHRs. This will also be described in a third embodiment to be described later.

In Embodiment 1.1, the PHR MAC CE may include a field indicating that one or two PHRs are to be reported (that is, whether the PHR MAC CE is for case 1 or for case 2). The field may be represented by 1 bit. The field may be included for each serving cell, or may be included in relation to a specific serving cell. Note that the field may be represented by 2 bits, and in that case, the field may indicate one of "one PHR for TRP1 is to be reported", "one PHR for TRP2 is to be reported", and "two PHRs are to be reported".

Embodiment 1.2

In Embodiment 1.2, regarding a serving cell in which MTRP PUSCH repetition is enabled by a higher layer parameter, two PHRs are invariably reported by the PHR MAC CE, regardless of case 1 or case 2.

Embodiment 1.2 is further broadly divided into two (Embodiments 1.2.1 and 1.2.2).

In Embodiment 1.2.1, two PHRs to be reported in case 1 have the same value. The same value may be calculated based on power control parameter (s) for PUSCH repetition/PUSCH transmission.

In Embodiment 1.2.2, an actual PHR is reported regarding a PHR for a TRP for which PUSCH repetition/PUSCH transmission is indicated by DCI among two PHRs to be reported in case 1. The actual PHR may be calculated based on power control parameter (s) for the PUSCH repetition/PUSCH transmission.

Regarding a PHR for the other TRP among the two PHRs to be reported, the type 1 PHR (in the present disclosure, this may be referred to as a reference PHR, a virtual PHR, a PHR according to a reference format, or the like) based on reference PUSCH transmission is to be reported. The virtual PHR may be calculated based on default power control parameter (s) already defined in Rel-15/16 NR, or may be calculated based on new default power control parameter (s).

Note that, in the present disclosure, the power control parameter (s) may be at least one of $P_{CMAX,f,c}$, Maximum Power Reduction (MPR), P-MPR, additional maximum power reduction (Additional MPR (A-MPR)), $\Delta Tc$, $P_0$, alpha, a path loss reference signal (Pathloss Reference Signal (PL-RS)), and a closed loop index (l). For example, in Rel-16 NR, the default power control parameters are MPR=0 [dB], A-MPR=0 [dB], P-MPR=0 [dB], and $\Delta T_C$=0 [dB], $P_0$ and alpha are obtained using $P_{0\_NOMINAL\_PUSCH,f,c}$ (0) and a higher layer parameter p0-PUSCH-AlphaSetId=0, downlink path loss estimation is obtained using a higher layer parameter pusch-PathlossReferenceRS-Id=0, and l=0.

Note that, in Embodiment 1.2.2, the PHR MAC CE may include a field indicating whether or not the PHR for a certain TRP is the virtual PHR. The field may be represented by 1 bit. The field may be included for each serving cell, or may be included in relation to a specific serving cell.

The default power control parameters for calculating the virtual PHR of Embodiment 1.2.2 may be different for each TRP, or may be the same (common). In the present disclosure, a fact that the default power control parameters for different TRPs are different may mean that a part of the power control parameters is different and the rest is common.

[Specific Example of PHR MAC CE of First Embodiment]

Figures 3A, 3B, 3C:
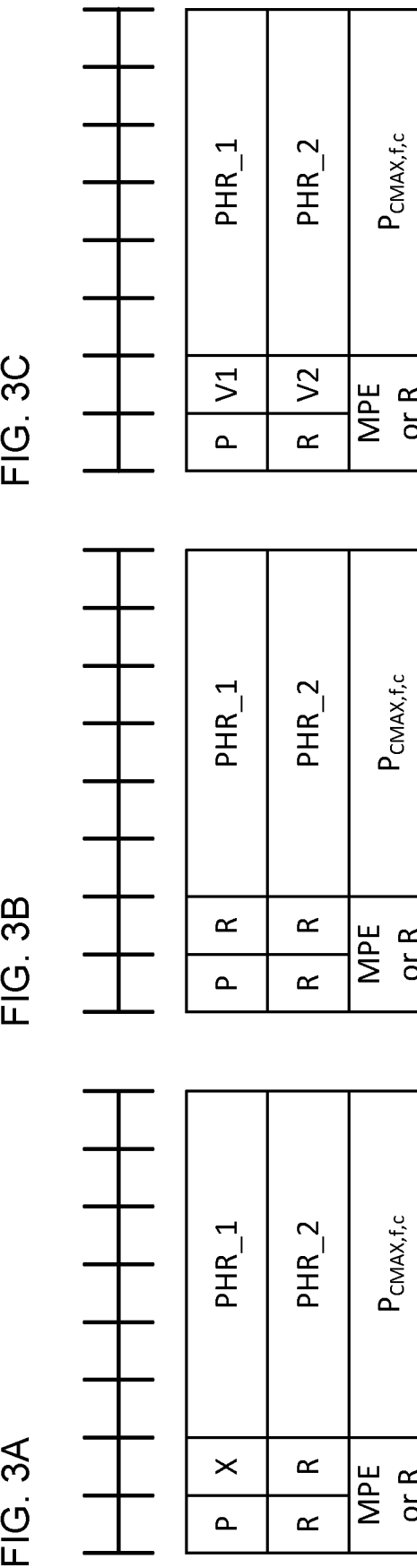
FIGS. 3A to 3C are diagrams to show examples of the single entry PHR MAC CE in a first embodiment.

FIGS. 3A to 3C are diagrams to show examples of the single entry PHR MAC CE in the first embodiment. FIGS. 3A, 3B, and 3C correspond to Embodiment 1.1, Embodiment 1.2.1, and Embodiment 1.2.2, respectively. Regarding each of these, differences from FIG. 1 will be described, and the same parts will not be repeatedly described. PHR_1 and PHR_2 may correspond to first and second PHRs reported by the PHR MAC CE, respectively, and may be of type 1 PH. PHR_1 and PHR_2 may indicate a PHR for TRP1 and a PHR for TRP2.

In FIG. 3A, an 'X' field corresponds to a field indicating that one or two PHRs described above are to be reported, and indicates whether or not an octet (one sequence of 8 bits shown in the figure) including PHR_2 is present. For example, X=1 may denote presence thereof, and X=0 may denote absence thereof (or vice versa). In other words, the size of the MAC CE is three octets if X=1, and is two octets if X=0 which is the same as the existing single entry PHR MAC CE.

In case 1, the UE may report the PHR by using the MAC CE of two octets indicating X=0, and in case 2, the UE may report the PHR by using the MAC CE of three octets indicating X=1.

FIG. 3B is the MAC CE of three octets. In Embodiment 1.2.1, the MAC CE may be used in both case 1 and case 2. In case 1, the UE generates the MAC CE by assigning the same value to PHR_1 and PHR_2. In case 2, the UE may assign different values to PHR_1 and PHR_2.

FIG. 3C is the MAC CE of three octets. In Embodiment 1.2.2, the MAC CE may be used in both case 1 and case 2. 'V1' and 'V2' field of FIG. 3C each correspond to a field indicating whether or not the PHR for a certain TRP described above is the virtual PHR, and indicate whether their immediately following PHR field is the actual PHR or the virtual PHR. 'V1' and 'V2' may be simply represented by 'V'.

For example, V=1 may denote that its immediately following PHR field is the virtual PHR, and V=0 may denote that its immediately following PHR field is the actual PHR (or vice versa).

In case 1, when transmission for TRP1 is indicated, the UE may report the actual PHR for TRP1 on PHR_1 and the virtual PHR for TRP2 on PHR_2, using the MAC CE of three octets indicating V1=0 and V2=1.

In case 1, when transmission for TRP2 is indicated, the UE may report the virtual PHR for TRP1 on PHR_1 and the actual PHR for TRP2 on PHR_2, using the MAC CE of three octets indicating V1=1 and V2=0.

In case 2, the UE may report the actual PHR for TRP1 on PHR_1 and the actual PHR for TRP2 on PHR_2, using the MAC CE of three octets indicating V1=0 and V2=0.

FIGS. 4A to 4C are diagrams to show examples of the multiple entry PHR MAC CE in the first embodiment. FIGS. 4A, 4B, and 4C correspond to Embodiment 1.1, Embodiment 1.2.1, and Embodiment 1.2.2, respectively. Regarding each of these, differences from FIG. 2 will be described, and the same parts will not be repeatedly described. PHR_j,1 and PHR_j,2 (j is an integer) may correspond to j-th first and second PHRs reported by the PHR MAC CE, respectively, and may be of type 1 PH. PHR_j,1 and PHR_j,2 may indicate the PHR for TRP1 and the PHR for TRP2, respectively.

In FIG. 4A, an '$X_i$' field corresponds to a field indicating that one or two PHRs described above are to be reported, and indicates whether or not an octet (one sequence of 8 bits shown in the figure) including PHR_j,2 corresponding to a $C_i$ field is present. For example, $X_i$=1 may denote presence thereof, and $X_i$=0 may denote absence thereof (or vice versa).

Note that an $X_0$ field may correspond to a field indicating that one or two PHRs are to be reported regarding serving cell index=0 (or the PCell or the SpCell). A $C_0$ field may be an R field. The same may hold true for the following figures.

In case 1, the UE may report one PHR regarding $C_i$ by using the MAC CE indicating $X_i$=0, and in case 2, the UE may report two PHRs regarding $C_i$ by using the MAC CE indicating $X_i$=1.

FIG. 4B is different from FIG. 2 in that there are octets including respective PHR_j,2. In Embodiment 1.2.1, the MAC CE may be used in both case 1 and case 2. In case 1, the UE generates the MAC CE by assigning the same value to PHR_j,1 and PHR_j,2. In case 2, the UE may assign different values to PHR_j,1 and PHR_j,2. The R field before PHR_j,2 may be a V field corresponding to PHR_j,2, but the R field functions as well because PHR_j,2 is the same as PHR_j,1 (in a case of case 1) or corresponds to the actual PHR (in a case of case 2). Thus, one or two R fields before PHR_j,2 may be used as other field (s).

FIG. 4C is different from FIG. 2 in that there are octets including respective PHR_j,2. In Embodiment 1.2.2, the MAC CE may be used in both case 1 and case 2. A 'V' field of FIG. 4C corresponds to a field indicating whether or not the PHR for a certain TRP described above is the virtual PHR, and indicates whether its immediately following PHR field is the actual PHR or the virtual PHR.

For example, V=1 may denote that its immediately following PHR field is the virtual PHR, and V=0 may denote that its immediately following PHR field is the actual PHR (or vice versa).

According to the first embodiment described above, the UE can appropriately generate/transmit the PHR report including the actual PHR.

Second Embodiment

A second embodiment relates to a report of a type 1 PHR based on reference PUSCH transmission. Note that the second embodiment may correspond to a PHR report not including the actual PHR (that is, including only the virtual PHR), or may correspond to a PHR report including the virtual PHR and the actual PHR.

The second embodiment may be applied to a case corresponding to at least one of case 1 and case 2, or may be applied to a case corresponding to neither of those (for example, a case in which PUSCH repetition/PUSCH transmission is not indicated by DCI).

Note that, in the second embodiment, "to report one/two PHR (s)" may mean "to report one/two PHR (s) regarding a serving cell in which the virtual PHR is reported". Such one/two PHR (s) to be reported may be of type 1 PH, or may be PH of another type.

The second embodiment is broadly divided into Embodiment 2.1 in which the UE reports one PHR and Embodiment 2.2 in which the UE reports two PHRS.

Embodiment 2.1

In Embodiment 2.1, one PHR to be reported may be calculated based on reference PUSCH transmission, using a method similar to that already defined in Rel-15/16 NR.

In Embodiment 2.1, the PHR MAC CE may include a field of 1 bit indicating that one or two PHRs are to be reported (that is, whether or not the PHR MAC CE includes the actual PHR). The field may be included for each serving cell, or may be included in relation to a specific serving cell. For example, the field may be the V field of the PHR MAC CE defined in Rel-15/16 NR.

Embodiment 2.2

In Embodiment 2.2, regarding a serving cell in which MTRP PUSCH repetition is enabled by a higher layer parameter, two virtual PHRs are invariably reported by the PHR MAC CE.

Embodiment 2.2 is further broadly divided into two (Embodiments 2.2.1 and 2.2.2).

In Embodiment 2.2.1, two virtual PHRs to be reported have the same value. The same value may be calculated based on default power control parameter (s) already defined in Rel-15/16 NR, or may be calculated based on new default power control parameter (s).

In Embodiment 2.2.2, regarding two virtual PHRs to be reported, default power control parameter (s) for calculation of the PHR for a certain TRP (for example, TRP1) and default power control parameter (s) for calculation of the PHR for another TRP (for example, TRP2) are different.

[Specific Example of PHR MAC CE of Second Embodiment]

Figure 5:
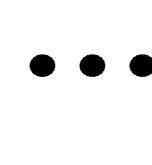
FIG. 5 is a diagram to show an example of the multiple entry PHR MAC CE in a second embodiment.

FIG. 5 is a diagram to show an example of the multiple entry PHR MAC CE in the second embodiment. FIG. 5 corresponds to Embodiment 2.1 and Embodiment 2.2. Differences from FIG. 2 will be described, and the same parts will not be repeatedly described. PHR_j,1 and PHR_j,2 (j is an integer) may correspond to j-th first and second PHRs reported by the PHR MAC CE, respectively, and may be of type 1 PH. PHR_j,1 and PHR_j,2 may indicate the PHR for TRP1 and the PHR for TRP2, respectively.

FIG. 5 has a configuration similar to that of FIG. 4B. In Embodiment 2.1 and Embodiment 2.2, the MAC CE may be used in both case 1 and case 2.

In Embodiment 2.1, a 'V' field of FIG. 5 corresponds to a field indicating that one or two PHRs described above are to be reported, and indicates whether or not an octet (one sequence of 8 bits shown in the figure) including PHR_j,2 corresponding to its immediately following PHR_j,1 field is present.

For example, V=1 may denote that the octet including PHR_j,2 corresponding to its immediately following PHR_j,1 field is absent, and V=0 may denote that the octet is present (or vice versa).

In Embodiment 2.1, PHR_j,2 may indicate the actual PHR. In Embodiment 2.2.1, PHR_j,1 and PHR_j,2 may have the same value, whereas in Embodiment 2.2.2, PHR_j,1 and PHR_j,2 may have different values.

In Embodiment 2.2, the 'V' field may be an R field, and may be used as another field. Note that, regarding FIG. 5, in Embodiment 2.2, if V=1, PHR_j,1 and PHR_j,2 may both denote the virtual PHR, and if V=0, PHR_j,1 and PHR_j,2 may both denote the actual PHR for MTRP repetition.

Note that, regarding the single entry PHR MAC CE as well, a part of the configuration of FIG. 5 may be used.

According to the second embodiment described above, the UE can appropriately generate/transmit the PHR report including the virtual PHR.

Third Embodiment

A third embodiment relates to a case in which a PHR of a second serving cell (serving cell 2) is transmitted using the PHR MAC CE on a PUSCH of a first serving cell (serving cell 1). Here, the PHR of serving cell 2 is based on actual PUSCH transmission of MTRP PUSCH repetition.

The third embodiment is broadly divided into Embodiments 3.1 to 3.3.

Embodiment 3.1

Embodiment 3.1 is applied to the following case: when a plurality of cells are configured for the UE for PUSCH transmission, an SCS configuration $\mu_1$ of an active UL BWP $b_1$ of a carrier $f_1$ of serving cell 1 and an SCS configuration $\mu_2$ of an active UL BWP $b_2$ of a carrier $f_2$ of serving cell 2 are the same (in plain words, a subcarrier spacing (SCS) of serving cell 1 and an SCS of serving cell 2 are the same), and the UE provides the type 1 PHR in PUSCH transmission of a slot in $b_1$, the UE provides the type 1 PHR for a first PUSCH of a slot in $b_2$ that overlaps the slot.

Note that the type 1 PHR of serving cell 2 is transmitted using the PUSCH in the slot of serving cell 1. The type 1 PHR of serving cell 2 is based on actual PUSCH transmission. Moreover, the first PUSCH that overlaps the slot (hereinafter also referred to as a PHR report slot) for reporting the PHR of serving cell 1 is one of MTRP PUSCH repetitions. Note that one unit of repetition may be referred to as a repetition occasion, a PUSCH occasion, or the like. In the present disclosure, the first PUSCH may be referred to as a first PUSCH repetition, a first PUSCH occasion, or the like. In the present disclosure, "first" may be interchangeably interpreted as "initial".

Figure 6:
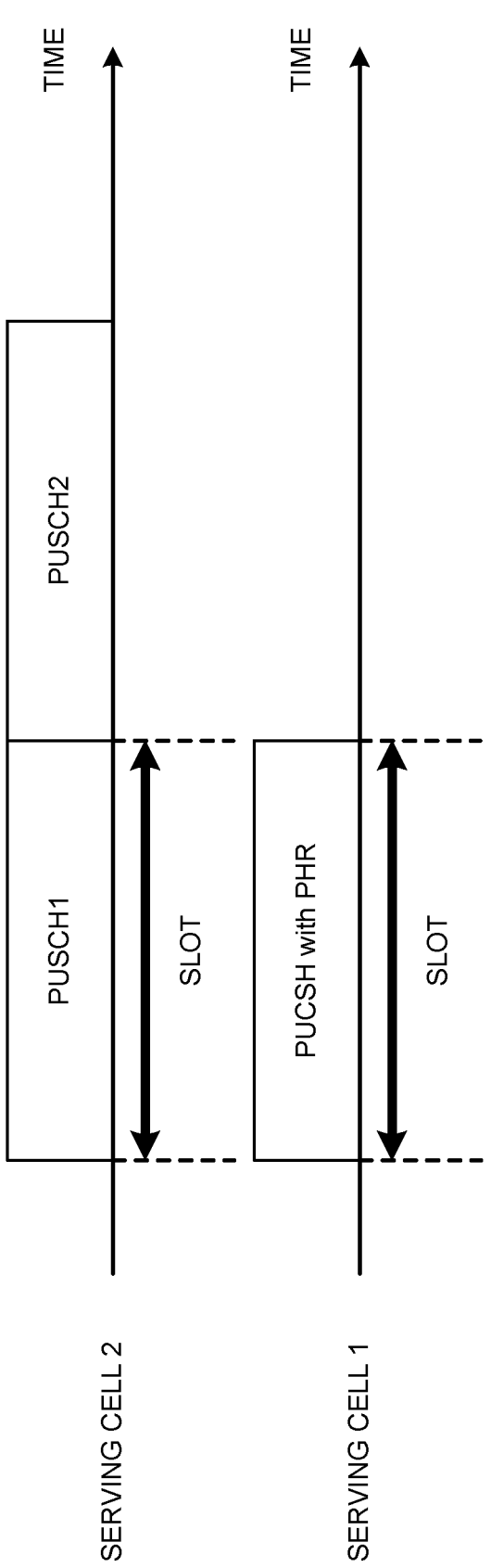
FIG. 6 is a diagram to show an example of Embodiment 3.1.

FIG. 6 is a diagram to show an example of Embodiment 3.1. Because the SCSs of serving cells 1 and 2 are the same, lengths of slots of these cells are the same. In serving cell 2, MTRP PUSCH repetition transmission is performed in a manner of overlapping the PHR report slot (slot expressed as "PUSCH with PHR") of serving cell 1. The number of repetitions is two, and repetitions of two slots (PUSCH 1 and PUSCH 2) are shown. In the following figures as well, PUSCH i may mean an i-th repetition in MTRP repetitions.

The first PUSCH corresponds to PUSCH 1 that overlaps the PHR report slot of serving cell 1. The PHR on PUSCH 1 of serving cell 2 is reported in the PHR report slot of serving cell 1.

Embodiment 3.1 is broadly divided into Embodiment 3.1.1 in which the UE reports one PHR as the PHR of serving cell 2 and Embodiment 3.1.2 in which the UE reports two PHRs as the PHR of serving cell 2.

One PHR to be reported in Embodiment 3.1.1 may be one of the following:

Embodiment 3.1.1-1: A PHR of the first PUSCH repetition in the slot of serving cell 2 that overlaps the PHR report slot of serving cell 1, Embodiment 3.1.1-2: A PHR of the first PUSCH repetition to TRP1 in the slot of serving cell 2 that overlaps the PHR report slot of serving cell 1, Embodiment 3.1.1-3: A PHR of the first PUSCH repetition to TRP2 in the slot of serving cell 2 that overlaps the PHR report slot of serving cell 1, Embodiment 3.1.1-4: A PHR of the first PUSCH repetition on the PUSCH of serving cell 2, Embodiment 3.1.1-5: A PHR of the first PUSCH repetition to TRP1 on the PUSCH of serving cell 2, Embodiment 3.1.1-6: A PHR of the first PUSCH repetition to TRP2 on the PUSCH of serving cell 2.

Two PHRs to be reported in Embodiment 3.1.2 may be one of the following:

Embodiment 3.1.2-1: PHRs of the first PUSCH repetition to TRP1 and the first PUSCH repetition to TRP2 in the slot of serving cell 2 that overlaps the PHR report slot of serving cell 1, Embodiment 3.1.2-2: PHRs of the first PUSCH repetition to TRP1 and the first PUSCH repetition to TRP2 on the PUSCH of serving cell 2.

Note that Embodiment 3.1.1-4, Embodiment 3.1.1-5, Embodiment 3.1.1-6, and Embodiment 3.1.2-2 may be applied to the PHR of serving cell 1 (the serving cell in which the PHR is transmitted), with serving cell 2 being replaced with serving cell 1.

Note that each embodiment of Embodiments 3.1.1 and 3.1.2 may be applied to at least one of the cases given below:

Case A: There is only one PUSCH repetition in the slot of serving cell 2 that overlaps the PHR report slot of serving cell 1, Case A1: The one PUSCH repetition is a repetition for any TRP, Case A2: The one PUSCH repetition is a repetition for TRP1, Case A3: The one PUSCH repetition is a repetition for TRP2, Case B: There are two or more PUSCH repetitions in the slot of serving cell 2 that overlaps the PHR report slot of serving cell 1, Case B1: The two or more PUSCH repetitions include repetitions for a plurality of TRPs, Case B2: All of the two or more PUSCH repetitions are repetitions for TRP1, Case B3: All of the two or more PUSCH repetitions are repetitions for TRP2.

Note that, of the embodiments shown in Embodiments 3.1.1 and 3.1.2, the same embodiment may be applied to one or more of the above cases, or different embodiments may be applied to different cases.

FIGS. 7A and 7B are diagrams to show examples of case A of Embodiment 3.1. Because the SCSs of serving cells 1 and 2 are the same, lengths of slots of these cells are the same. In serving cell 2, MTRP PUSCH repetition transmission is performed in a manner of overlapping the PHR report slot of serving cell 1. The number of repetitions is four, and repetitions of four slots (PUSCHs 1 to 4) are shown. Note that cyclic mapping is applied to the MTRP repetitions.

The cyclic mapping is a mapping pattern (or method) in which (beams for) TRP1 and TRP2 are mapped to first and second repetitions and the same mapping is applied to the rest of repetitions. Note that, as the mapping pattern, sequential mapping, half-half mapping, or the like may be applied.

The PHR report slot of serving cell 1 overlaps PUSCH 1 in FIG. 7A and overlaps PUSCH 2 in FIG. 7B.

In the example of FIG. 7A, when Embodiment 3.1.1-1 is adopted, regarding serving cell 2, the UE reports one PHR (a PHR for PUSCH 1) in the PHR report slot. In the example of FIG. 7A, when Embodiment 3.1.2-2 is adopted, regarding serving cell 2, the UE reports two PHRs (a PHR for PUSCH 1 and a PHR for PUSCH 2) in the PHR report slot.

In the example of FIG. 7B, when Embodiment 3.1.1-1 is adopted, regarding serving cell 2, the UE reports one PHR (a PHR for PUSCH 2) in the PHR report slot. In the example of FIG. 7B, when Embodiment 3.1.1-4 is adopted, regarding serving cell 2, the UE reports one PHR (a PHR for PUSCH 1) in the PHR report slot. In the example of FIG. 7B, when Embodiment 3.1.2-2 is adopted, regarding serving cell 2, the UE reports two PHRs (a PHR for PUSCH 1 and a PHR for PUSCH 2) in the PHR report slot.

Figures 8A, 8B:
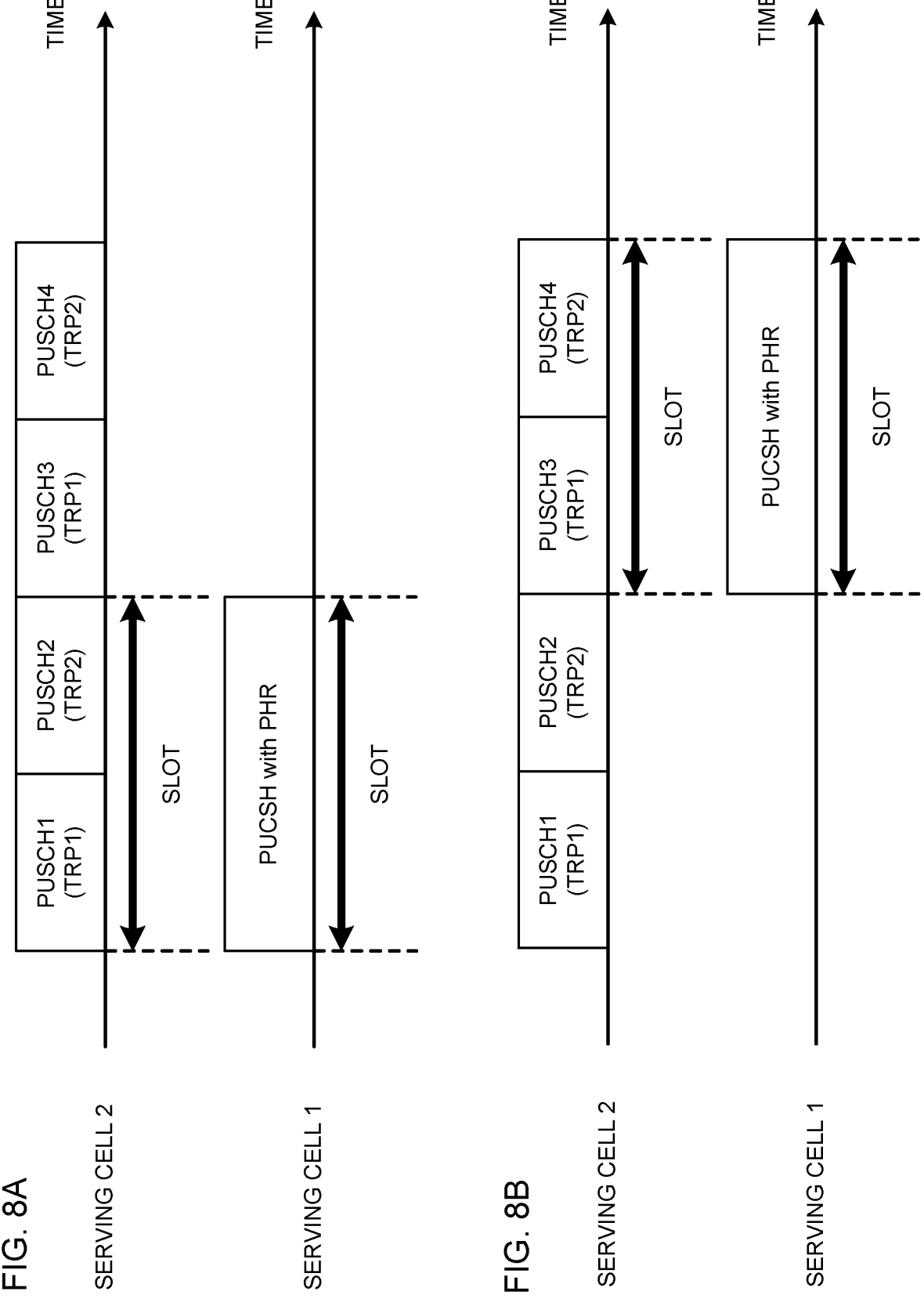
FIGS. 8A and 8B are diagrams to show examples of case B of Embodiment 3.1.

FIGS. 8A and 8B are diagrams to show examples of case B of Embodiment 3.1. Because the SCSs of serving cells 1 and 2 are the same, lengths of slots of these cells are the same. In serving cell 2, MTRP PUSCH repetition transmission is performed in a manner of overlapping the PHR report slot of serving cell 1. The number of repetitions is four, and four repetitions (PUSCHs 1 to 4) are shown. Note that cyclic mapping is applied to the MTRP repetitions. One repetition period corresponds to a half-slot (or a sub-slot, a plurality of symbols).

The PHR report slot of serving cell 1 overlaps PUSCHs 1 and 2 in FIG. 8A and overlaps PUSCHs 3 and 4 in FIG. 8B.

In the example of FIG. 8A, when Embodiment 3.1.1-1 is adopted, regarding serving cell 2, the UE reports one PHR (a PHR for PUSCH 1) in the PHR report slot. In the example of FIG. 8A, when Embodiment 3.1.2-1/3.1.2-2 is adopted, regarding serving cell 2, the UE reports two PHRs (a PHR for PUSCH 1 and a PHR for PUSCH 2) in the PHR report slot.

In the example of FIG. 8B, when Embodiment 3.1.1-1 is adopted, regarding serving cell 2, the UE reports one PHR (a PHR for PUSCH 3) in the PHR report slot. In the example of FIG. 8B, when Embodiment 3.1.1-4 is adopted, regarding serving cell 2, the UE reports one PHR (a PHR for PUSCH 1) in the PHR report slot. In the example of FIG. 8B, when Embodiment 3.1.2-1 is adopted, regarding serving cell 2, the UE reports two PHRs (a PHR for PUSCH 3 and a PHR for PUSCH 4) in the PHR report slot. In the example of FIG. 8B, when Embodiment 3.1.2-2 is adopted, regarding serving cell 2, the UE reports two PHRs (a PHR for PUSCH 1 and a PHR for PUSCH 2) in the PHR report slot.

Embodiment 3.2

Embodiment 3.2 is applied to the following case: when a plurality of cells are configured for the UE for PUSCH transmission, the SCS configuration $\mu_1$ of the active UL BWP $b_1$ of the carrier $f_1$ of serving cell 1 is smaller than the SCS configuration $\mu_2$ of the active UL BWP $b_2$ of the carrier $f_2$ of serving cell 2 (in plain words, the SCS of serving cell 1 is smaller than the SCS of serving cell 2), and the UE provides the type 1 PHR in PUSCH transmission of a slot (PHR report slot) in $b_1$ that overlaps a plurality of slots in $b_2$, the UE provides the type 1 PHR for a first PUSCH in a first slot of the plurality of slots in $b_2$ that fully overlaps the PHR report slot.

Note that the type 1 PHR of serving cell 2 is transmitted using the PUSCH in the slot of serving cell 1. The type 1 PHR of serving cell 2 is based on actual PUSCH transmission. Moreover, the first PUSCH in the first slot that fully overlaps the PHR report slot of serving cell 1 is one of MTRP PUSCH repetitions.

Figure 9:
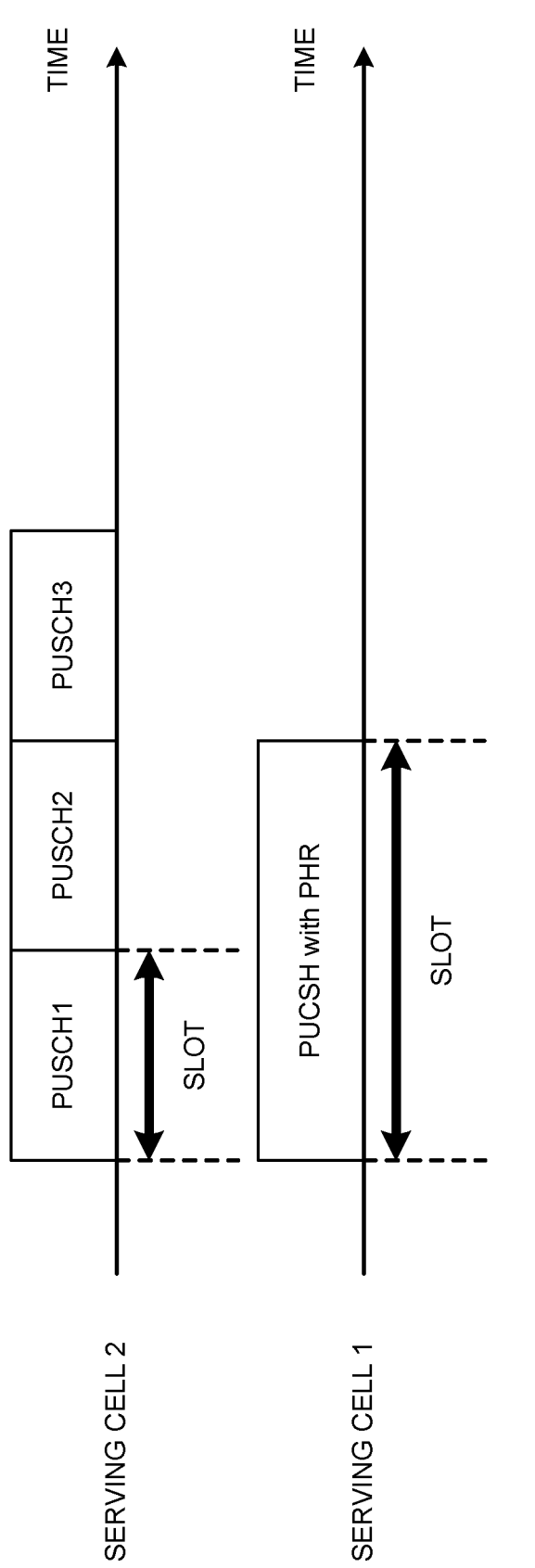
FIG. 9 is a diagram to show an example of Embodiment 3.2.

FIG. 9 is a diagram to show an example of Embodiment 3.2. The SCS of serving cell 1 is smaller than the SCS of serving cell 2, and in the present example, the latter is twice as large as the former (for example, the SCS of serving cell 1 is 15 kHz and the SCS of serving cell 2 is 30 kHz). Thus, actual time length of the slot of serving cell 1 is twice as large as actual time length of the slot of serving cell 2. Unless otherwise specifically noted, the same holds true for the figures for description of Embodiment 3.2.

In serving cell 2, MTRP PUSCH repetition transmission is performed in a manner of overlapping the PHR report slot (slot expressed as "PUSCH with PHR") of serving cell 1. The number of repetitions is three, and repetitions of three slots (PUSCHs 1 to 3) are shown.

The first PUSCH corresponds to PUSCH 1 in the first slot in a plurality of slots that fully overlaps the PHR report slot of serving cell 1. The PHR on PUSCH 1 of serving cell 2 may be reported in the PHR report slot of serving cell 1.

Embodiment 3.2 is broadly divided into Embodiment 3.2.1 in which the UE reports one PHR as the PHR of serving cell 2 and Embodiment 3.2.2 in which the UE reports two PHRs as the PHR of serving cell 2.

Embodiments 3.2.1 and 3.2.2 may be embodiments obtained by replacing Embodiments 3.1.1 and 3.1.2 described above as follows, respectively:

Embodiment 3.2.1a/3.2.2a: The "slot of serving cell 2 that overlaps the PHR report slot of serving cell 1" is replaced with the "first slot of serving cell 2 that fully overlaps the PHR report slot of serving cell 1", Embodiment 3.2.1b/3.2.2b: The "slot of serving cell 2 that overlaps the PHR report slot of serving cell 1" is replaced with a "plurality of slots of serving cell 2 that fully overlap the PHR report slot of serving cell 1".

Note that, regarding Embodiment 3.2.1a/3.2.2a and Embodiment 3.2.1b/3.2.2b, "fully overlap" in the above replacement may be replaced with "overlap". The "first slot of serving cell 2" of Embodiment 3.2.1a/3.2.2a may be interchangeably replaced with the "first slot of a plurality of slots of serving cell 2".

In the following, Embodiment 3.2.1a/3.2.2a is also collectively referred to as Embodiment 3.2a. Embodiment 3.2.1b/3.2.2b is also collectively referred to as Embodiment 3.2b. Note that embodiments that do not require replacement may be used as they are. For example, Embodiments 3.1.1-4 to 3.1.1-6, 3.1.2-2, and the like may be applied as they are since there is no description of the "slot of serving cell 2 that overlaps the PHR report slot of serving cell 1".

Figures 10A, 10B:
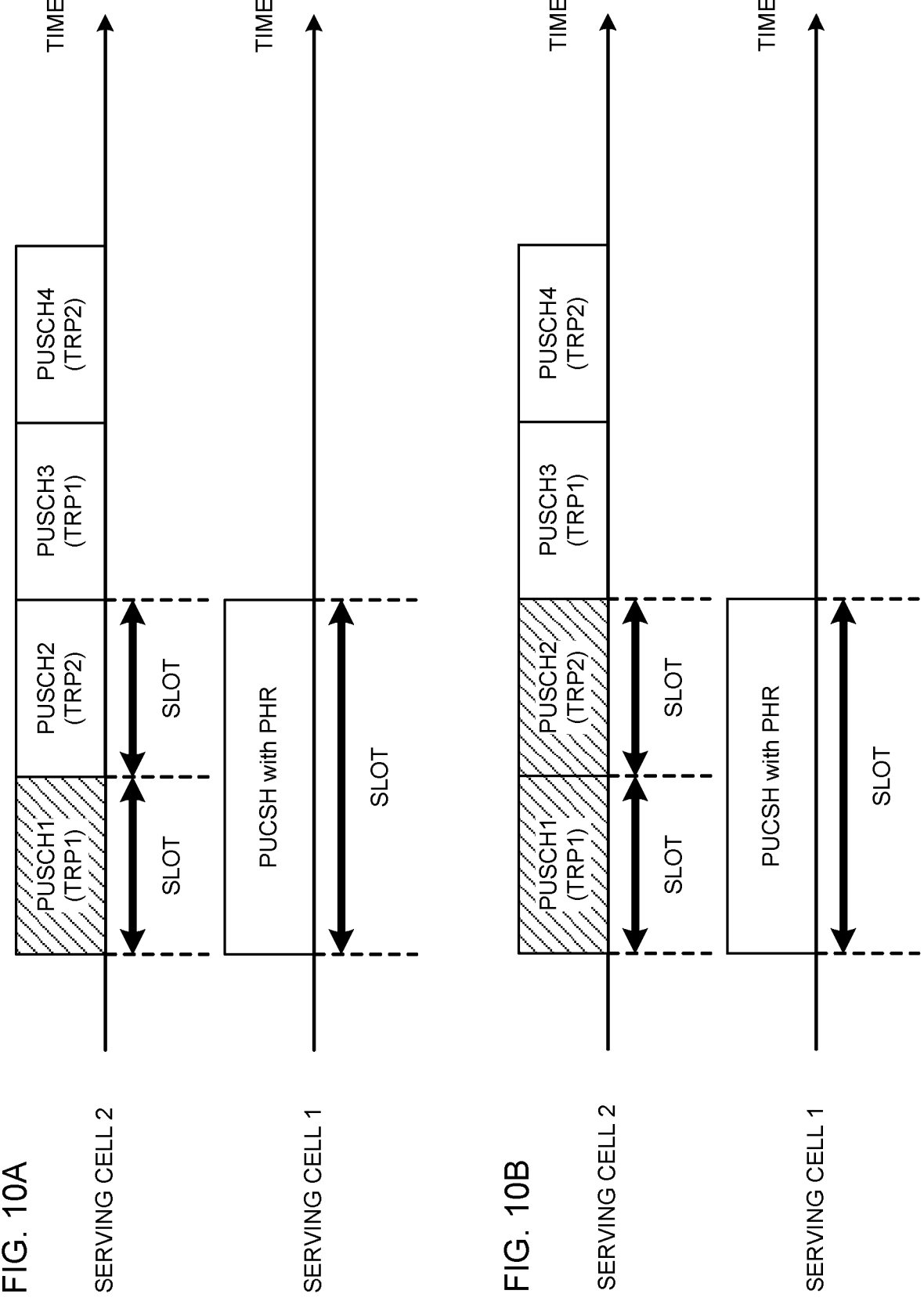
FIGS. 10A and 10B are diagrams to show examples of differences between Embodiments 3.2a and 3.2b.

FIGS. 10A and 10B are diagrams to show examples of differences between Embodiments 3.2a and 3.2b.

In serving cell 2, MTRP PUSCH repetition transmission is performed in a manner of overlapping the PHR report slot of serving cell 1. The number of repetitions is four, and repetitions of four slots (PUSCHs 1 to 4) are shown. Note that cyclic mapping is applied to the MTRP repetitions.

FIG. 10A corresponds to Embodiment 3.2a, and the "first slot of serving cell 2 that fully overlaps the PHR report slot of serving cell 1" is hatched. The first slot corresponds to the slot of PUSCH 1 among the slot of PUSCH 1 and the slot of PUSCH 2 that overlap the PHR report slot.

FIG. 10B corresponds to Embodiment 3.2b, and the "plurality of slots of serving cell 2 that fully overlap the PHR report slot of serving cell 1" are hatched. The plurality of slots correspond to the slot of PUSCH 1 and the slot of PUSCH 2 that overlap the PHR report slot.

Note that each embodiment of Embodiments 3.2a and 3.2b may be applied to at least one of case A, cases A1 to A3, case B, cases B1 to B3, and the like described in Embodiment 3.1. Note that, of the embodiments of Embodiments 3.2a and 3.2b, the same embodiment may be applied to one or more of the above cases, or different embodiments may be applied to different cases.

Figures 11A, 11B:
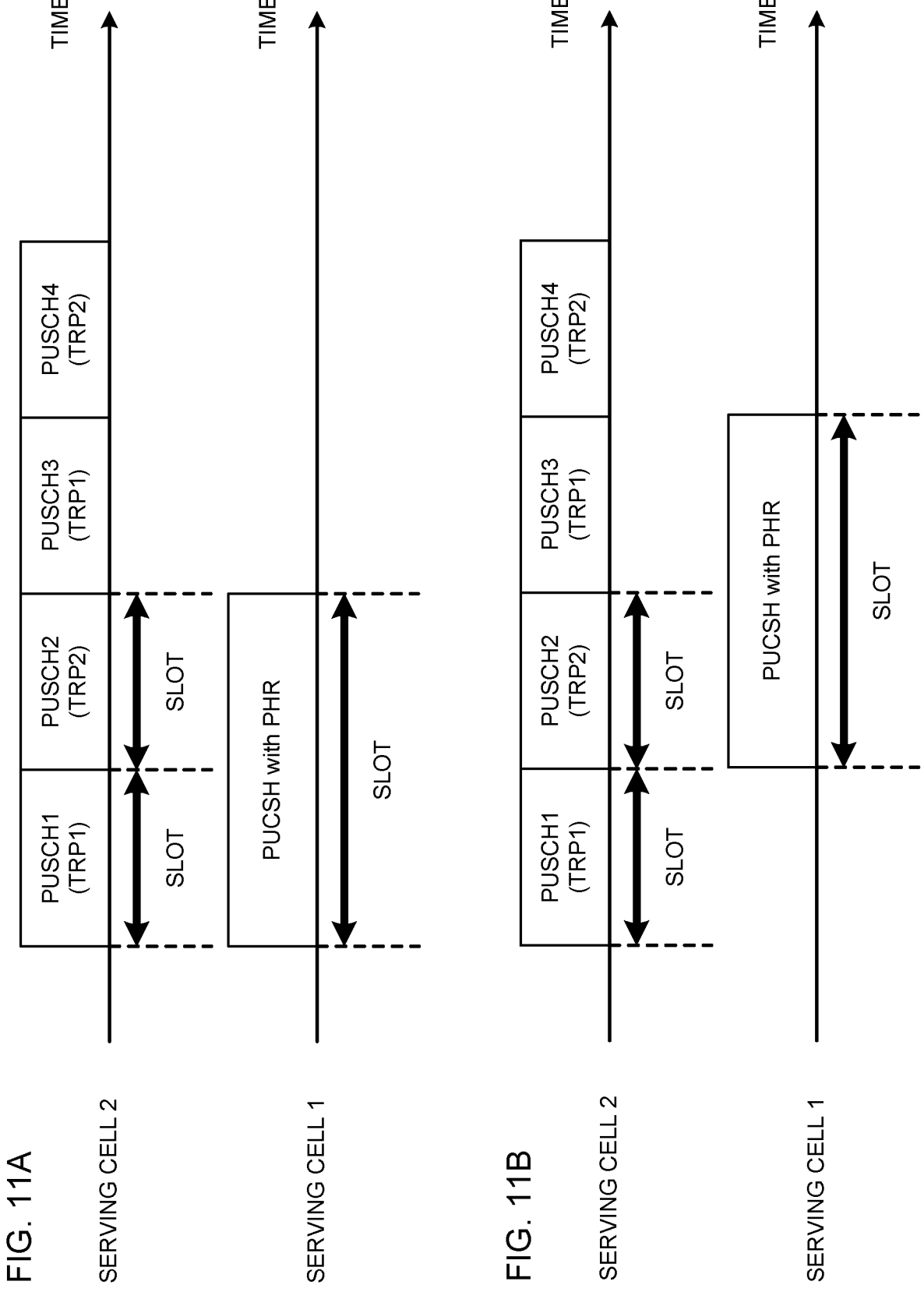

FIGS. 11A and 11B are diagrams to show examples of case A of Embodiment 3.2a. The PHR report slot of serving cell 1 overlaps the slots of PUSCH 1 and PUSCH 2 in FIG. 11A, and overlaps the slots of PUSCH 2 and PUSCH 3 in FIG. 11B.

In the example of FIG. 11A, when Embodiment 3.2.1-1a (an embodiment obtained by replacing Embodiment 3.1.1-1 based on Embodiment 3.2a; embodiments are hereinafter referred to according to the same rule) is adopted, regarding serving cell 2, the UE reports one PHR (a PHR for PUSCH 1) in the PHR report slot. In the example of FIG. 11A, when Embodiment 3.2.2-2a (note that no replacement is applied) is adopted, regarding serving cell 2, the UE reports two PHRs (a PHR for PUSCH 1 and a PHR for PUSCH 2) in the PHR report slot.

In the example of FIG. 11B, when Embodiment 3.2.1-1a is adopted, regarding serving cell 2, the UE reports one PHR (a PHR for PUSCH 2) in the PHR report slot. In the example of FIG. 11B, when Embodiment 3.2.1-4a (note that no replacement is applied) is adopted, regarding serving cell 2, the UE reports one PHR (a PHR for PUSCH 1) in the PHR report slot. In the example of FIG. 11B, when Embodiment 3.2.2-2a (note that no replacement is applied) is adopted, regarding serving cell 2, the UE reports two PHRs (a PHR for PUSCH 1 and a PHR for PUSCH 2) in the PHR report slot.

Figures 12A, 12B:
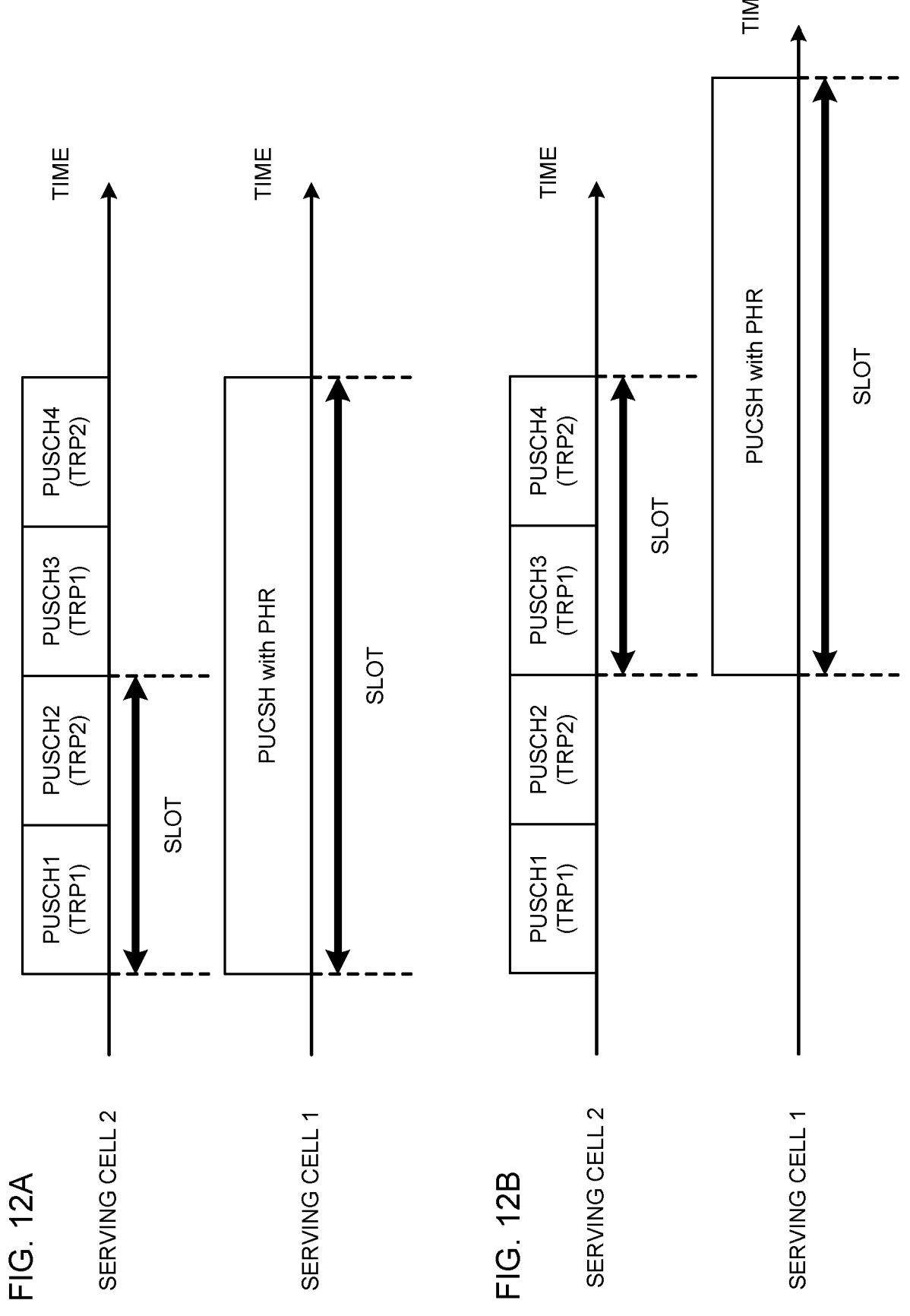
FIGS. 12A and 12B are diagrams to show examples of case B of Embodiment 3.2.

FIGS. 12A and 12B are diagrams to show examples of case B of Embodiment 3.2. Because the SCS of serving cell 1 is half as large as the SCS of serving cell 2, slot length of serving cell 1 is twice as large as slot length of serving cell 2. In serving cell 2, MTRP PUSCH repetition transmission (four times) is performed in a manner of overlapping the PHR report slot of serving cell 1. One repetition period corresponds to a half-slot (or a sub-slot, a plurality of symbols) for the slot of serving cell 2.

The PHR report slot of serving cell 1 overlaps all of the slots of PUSCHs 1 to 4 in FIG. 12A, and overlaps PUSCHs 3 and 4 in FIG. 12B (start timing is the same as the slot of PUSCH 3).

In the example of FIG. 12A, when Embodiment 3.2.1-1a is adopted, regarding serving cell 2, the UE reports one PHR (a PHR for PUSCH 1) in the PHR report slot. In the example of FIG. 12A, when Embodiment 3.2.2-1a/3.2.2-2a is adopted, regarding serving cell 2, the UE reports two PHRs (a PHR for PUSCH 1 and a PHR for PUSCH 2) in the PHR report slot.

In the example of FIG. 12B, when Embodiment 3.2.1-1a is adopted, regarding serving cell 2, the UE reports one PHR (a PHR for PUSCH 3) in the PHR report slot. In the example of FIG. 12B, when Embodiment 3.2.1-4a (note that no replacement is applied) is adopted, regarding serving cell 2, the UE reports one PHR (a PHR for PUSCH 1) in the PHR report slot. In the example of FIG. 12B, when Embodiment 3.2.2-1a is adopted, regarding serving cell 2, the UE reports two PHRs (a PHR for PUSCH 3 and a PHR for PUSCH 4) in the PHR report slot. In the example of FIG. 12B, when Embodiment 3.2.2-2a (note that no replacement is applied) is adopted, regarding serving cell 2, the UE reports two PHRs (a PHR for PUSCH 1 and a PHR for PUSCH 2) in the PHR report slot.

Figure 13:
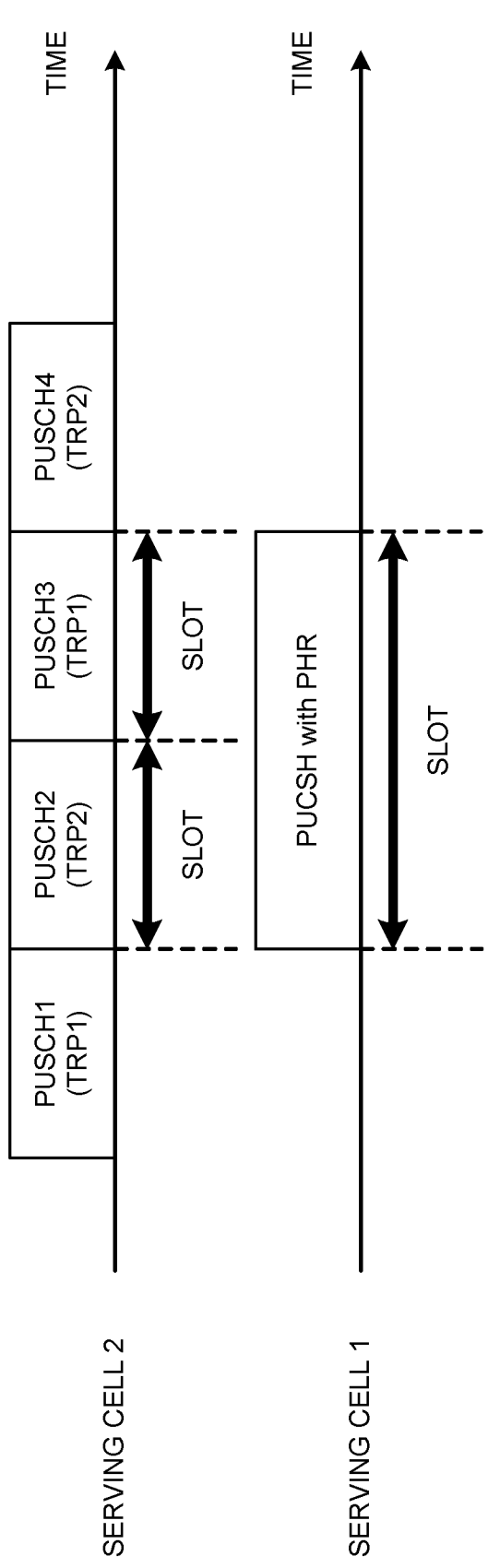
FIG. 13 is a diagram to show another example of case B of Embodiment 3.2.

FIG. 13 is a diagram to show another example of case B of Embodiment 3.2. The example of FIG. 13 has the same configuration as the example of FIG. 11B, and thus overlapping description will not be repeated.

In the example of FIG. 13, when Embodiment 3.2.1-1a is adopted, regarding serving cell 2, the UE reports one PHR (a PHR for PUSCH 2) in the PHR report slot. In the example of FIG. 13, when Embodiment 3.2.1-4a (note that no replacement is applied) is adopted, regarding serving cell 2, the UE reports one PHR (a PHR for PUSCH 1) in the PHR report slot. In the example of FIG. 13, when Embodiment 3.2.2-1a is adopted, regarding serving cell 2, the UE reports two PHRs (a PHR for PUSCH 2 and a PHR for PUSCH 3) in the PHR report slot. In the example of FIG. 13, when Embodiment 3.2.2-2a (note that no replacement is applied) is adopted, regarding serving cell 2, the UE reports two PHRs (a PHR for PUSCH 1 and a PHR for PUSCH 2) in the PHR report slot.

Embodiment 3.3

Embodiment 3.3 is applied to the following case: when a plurality of cells are configured for the UE for PUSCH transmission, and the UE provides the type 1 PHR in PUSCH transmission which uses PUSCH repetition type B having nominal repetition over a plurality of slots in the active UL BWP $b_1$ and overlaps one or more slots in the active UL BWP $b_2$, the UE provides the type 1 PHR for the first PUSCH in the first slot of the one or more slots in $b_2$ that overlaps the plurality of slots in $b_1$.

Note that the type 1 PHR of serving cell 2 is transmitted using the PUSCH in the slot of serving cell 1. The type 1 PHR of serving cell 2 is based on actual PUSCH transmission. Moreover, the first PUSCH in the first slot that overlaps the plurality of slots (the plurality of slots may be referred to as the PHR report slot) of the nominal repetition of serving cell 1 is one of MTRP PUSCH repetitions.

Embodiment 3.3 is broadly divided into Embodiment 3.3.1 in which the UE reports one PHR as the PHR of serving cell 2 and Embodiment 3.3.2 in which the UE reports two PHRs as the PHR of serving cell 2.

Embodiments 3.3.1 and 3.3.2 may be embodiments obtained by replacing Embodiments 3.1.1 and 3.1.2 described above as follows, respectively:

Embodiment 3.3.1a/3.3.2a: The "slot of serving cell 2 that overlaps the PHR report slot of serving cell 1" is replaced with the "first slot of serving cell 2 that fully overlaps a plurality of slots of nominal repetition of serving cell 1", Embodiment 3.3.1b/3.3.2b: The "slot of serving cell 2 that overlaps the PHR report slot of serving cell 1" is replaced with a "plurality of slots of serving cell 2 that fully overlap a plurality of slots of nominal repetition of serving cell 1".

Note that, regarding Embodiment 3.3.1a/3.3.2a and Embodiment 3.3.1b/3.3.2b, "fully overlap" in the above replacement may be replaced with "overlap". The "first slot of serving cell 2" of Embodiment 3.3.1a/3.3.2a may be interchangeably replaced with the "first slot of a plurality of slots of serving cell 2".

Note that Embodiment 3.3.1a/3.3.2a is also collectively referred to as Embodiment 3.3a. Embodiment 3.3.1b/3.3.2b is also collectively referred to as Embodiment 3.3b. Note that embodiments that do not require replacement may be used as they are. For example, Embodiments 3.1.1-4 to 3.1.1-6, 3.1.2-2, and the like may be applied as they are since there is no description of the "slot of serving cell 2 that overlaps the PHR report slot of serving cell 1".

[PHR MAC CE of Third Embodiment]

In the third embodiment, the UE may report one or two actual PHRs per serving cell.

In the third embodiment, the PHR MAC CE may include one or two PHR fields for each serving cell. The PHR MAC CE may include a field indicating that one or two PHRs are to be reported. The field may be represented by 1 bit. The field may be included for each serving cell, or may be included in relation to a specific serving cell. Note that the field may be represented by 2 bits, and in that case, the field may indicate one of "one PHR for TRP1 is to be reported", "one PHR for TRP2 is to be reported", and "two PHRs are to be reported". Regarding a certain serving cell, if one or two actual PHRs are "to be reported" based on the third embodiment, the PHR MAC CE may include one or two PHR fields regarding the serving cell. The PHR MAC CE may have the configuration of FIG. 4A, for example.

In the third embodiment, the PHR MAC CE may invariably include two PHR fields for each serving cell. Regarding a certain serving cell, if one actual PHR is "to be reported" based on the third embodiment, the PHR MAC CE may include two PHR fields having the same value regarding the serving cell (the value may be calculated according to the actual PHR "to be reported"). The PHR MAC CE may have the configuration of FIG. 4B, for example.

In the third embodiment, the PHR MAC CE may invariably include two PHR fields for each serving cell. Regarding a certain serving cell, if one actual PHR is determined "to be reported" based on the third embodiment, the PHR MAC CE may include two PHR fields regarding the serving cell. Of these PHR fields, one may indicate the actual PHR regarding the TRP in which the actual PHR is "to be reported", and the other may indicate the virtual TRP regarding another TRP. As described above in Embodiment 1.2.2 as well, the virtual PHR may be calculated based on default power control parameter (s), and the PHR MAC CE may include a field indicating whether or not the PHR for a certain TRP is the virtual PHR. Embodiment 1.2.2 may be adopted for configurations that are not specifically noted herein. The PHR MAC CE may have the configuration of FIG. 4C, for example.

According to the third embodiment described above, the UE can appropriately generate/transmit the PHR report when PUSCH transmissions of a plurality of cells overlap.

According to the third embodiment described above, the UE can preferably trigger PHR MAC CE transmission.

Fourth Embodiment

A fourth embodiment relates to a case in which MTRP PUSCH repetition is supported, and separate power controls (for example, use of separate PL-RSs) are supported for different TRPs. Note that the fourth embodiment may be applied irrespective of support of the separate power controls.

In Rel-16 NR, there is an event based on path loss variation as one of PHR triggering events. For example, when path loss varies beyond a certain threshold regarding at least one activated serving cell of any MAC entity used as a path loss reference for UL transmission at or after the last transmission of the PHR, the PHR may be triggered. The path loss variation may be a difference between path loss in the last transmission and path loss in the UL transmission.

In the fourth embodiment, path loss (hereinafter also referred to as "path loss of the last transmission", "last path loss", "path loss measured in a path loss reference at last transmission time of a PHR", or the like) in the last transmission of a PHR in the MAC entity may correspond to one of the following:

Case x1: It is based on actual PUSCH transmission, and based on MTRP PUSCH repetition (for example, MTRP repetition is indicated by DCI), Case x2: It is based on actual PUSCH transmission, and based on STRP PUSCH repetition or single transmission (for example, STRP repetition is indicated by DCI, or repetition number=1 is indicated by DCI), Case x3: It is based on reference PUSCH transmission.

In the fourth embodiment, path loss (hereinafter also referred to as "path loss of the current transmission", "current path loss", "path loss measured in a path loss reference at present time", or the like) in the current new UL transmission in the MAC entity may also correspond to one of above cases x1 to x3.

Thus, when path loss variation of a serving cell is determined, the following cases y1 to y9 are conceivable, which are nine cases obtained by combining cases x1 to x3 regarding the last path loss and cases x1 to x3 regarding the current path loss:

Case y1: The last path loss is of case x1, and the current path loss is of case x1, Case y2: The last path loss is of case x1, and the current path loss is of case x2, Case y3: The last path loss is of case x1, and the current path loss is of case x3, Case y4: The last path loss is of case x2, and the current path loss is of case x1, Case y5: The last path loss is of case x2, and the current path loss is of case x2, Case y6: The last path loss is of case x2, and the current path loss is of case x3, Case y7: The last path loss is of case x3, and the current path loss is of case x1, Case y8: The last path loss is of case x3, and the current path loss is of case x2, Case y9: The last path loss is of case x3, and the current path loss is of case x3.

In any of the cases, path loss variation for PHR triggering is determined with the path loss for PUSCH repetition of TRP1/2 of the current transmission being compared to the path loss for PUSCH repetition of TRP1/2 of the last transmission.

In cases y1, y4, and y7 (that is, the current path loss is of case x1), the current path loss for TRP1/2 is calculated based on actual transmission.

In cases y2, y5, and y8 (that is, the current path loss is of case x2), the current path loss for the TRP indicated for the current transmission is calculated based on actual transmission. In contrast, the current path loss for the TRP not indicated for the current transmission is calculated based on reference PUSCH transmission (that is, similarly to virtual PHR calculation).

In cases y3, y6, and y9 (that is, the current path loss is of case x3), the current path loss for TRP1/2 is calculated based on reference PUSCH transmission.

In cases y1 to y3 (that is, the last path loss is of case x1), the last path loss for TRP1/2 is calculated based on actual transmission.

In cases y4 to y6 (that is, the last path loss is of case x2), the last path loss for the TRP indicated for the last transmission is calculated based on actual transmission. In contrast, the last path loss for the TRP not indicated for the last transmission may be calculated based on reference PUSCH transmission (that is, similarly to virtual PHR calculation). Note that, regarding the TRP not indicated for the last transmission, the current path loss for the TRP may be compared to the last path loss for the TRP indicated for the last transmission.

Figure 14:
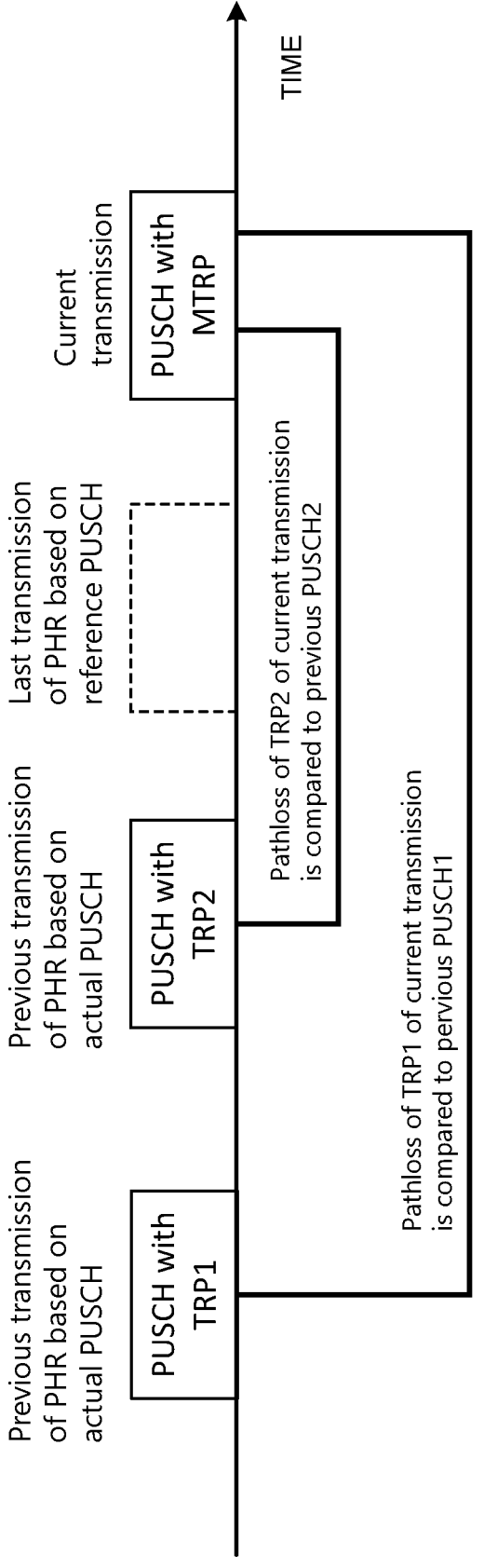
FIG. 14 is a diagram to show an example of calculation of path loss variation for each TRP in case y7.

In cases y7 to y9 (that is, the last path loss is of case x3), the last path loss for TRP1/2 may be calculated based on reference PUSCH transmission. Note that, in cases y7 to y9 (that is, the last path loss is of case x3), the last path loss for TRP1/2 may be calculated based on the last transmission of the PHR based on actual PUSCH transmission for TRP1/2, which is previous to the last transmission of the PHR based on a reference PUSCH. FIG. 14 is a diagram to show an example of calculation of path loss variation for each TRP in case y7. "PUSCH with MTRP" shown in the figure is the current transmission corresponding to MTRP PUSCH repetition. The last transmission of the PHR in the MAC entity is indicated by a broken line, and the last path loss for TRP1/2 may be calculated based on the reference PUSCH. In contrast, the last path loss for TRP1/2 may be derived based on an actual PUSCH of TRP1/2 previous to the last transmission. In this case, path loss variation (a difference between the last path loss and the current path loss) regarding TRP1/2 may be calculated based on the current actual PUSCH transmission regarding TRP1/2 and its previous actual PUSCH transmissions regarding TRP1/2. These "previous actual PUSCH transmissions" may each be actual PUSCH transmission for TRP1/2 when the PHR is reported last, or may each be actual PUSCH transmission for TRP1/2 corresponding to the PHR when the PHR regarding TRP1/2 is reported last. Regarding case y8, "PUSCH with MTRP" of FIG. 14 may be replaced with "PUSCH with STRP".

Note that, regarding the path loss calculated based on reference PUSCH transmission, separate default PL-RSs (for example, a PL-RS corresponding to pusch-PathlossReferenceRS-Id=first value and a PL-RS corresponding to pusch-PathlossReferenceRS-Id=second value) may be used for TRP1 and TRP2, or a common default PL-RS (for example, a PL-RS corresponding to pusch-PathlossReferenceRS-Id=0) may be used for both of TRP1 and TRP2.

Regarding a certain serving cell, when at least one of the following conditions z1 to z6 is satisfied, the PHR may be triggered:

Condition z1: Path loss variation of PUSCH repetition to TRP1 or path loss variation of PUSCH repetition to TRP2 is larger than a threshold, Condition z2: Both of path loss variation of PUSCH repetition to TRP1 and path loss variation of PUSCH repetition to TRP2 are larger than their respective thresholds, Condition z3: Path loss variation of PUSCH repetition to TRP1 is larger than a threshold, Condition z4: Path loss variation of PUSCH repetition to TRP2 is larger than a threshold, Condition z5: Path loss variation regarding the TRP indicated for the current transmission is larger than a threshold, Condition z6: Path loss variation regarding the TRP indicated for the last transmission is larger than a threshold.

The threshold (s) may be given by a higher layer parameter phr-Tx-PowerFactorChange, for example. Note that, for the threshold (s), separate values may be (independently) configured for TRP1 and TRP2, or one value may be configured and applied to both of TRP1 and TRP2.

For example, when cases y1, y3, y7, and y9 are adopted regarding a certain serving cell, the UE may trigger the PHR when at least one of above conditions z1 to z4 is satisfied. Note that, in case y9, the UE may trigger the PHR when a condition different from above conditions z1 to z4 is satisfied. For example, the UE may compare the current path loss based on reference PUSCH transmission with the last path loss based on reference PUSCH transmission and derive path loss variation. When the path loss variation is larger than the threshold (for example, phr-Tx-PowerFactorChange), the PHR may be triggered.

When cases y2 and y8 are adopted regarding a certain serving cell, the UE may trigger the PHR when at least one of above conditions z1 to z5 is satisfied. Note that, in case y8, the UE may trigger the PHR when a condition different from above conditions z1 to z5 is satisfied. For example, the UE may compare the current path loss based on actual PUSCH transmission with the last path loss based on reference PUSCH transmission and derive path loss variation, regardless of which TRP is indicated for current transmission. When the path loss variation is larger than the threshold (for example, phr-Tx-PowerFactorChange), the PHR may be triggered.

When cases y4 and y6 are adopted regarding a certain serving cell, the UE may trigger the PHR when at least one of above conditions z1 to z4 and z6 is satisfied. Note that, in case y6, the UE may trigger the PHR when a condition different from above conditions z1 to z4 and z6 is satisfied. For example, the UE may compare the current path loss based on reference PUSCH transmission with the last path loss based on actual transmission and derive path loss variation, regardless of which TRP is indicated for previous transmission. When the path loss variation is larger than the threshold (for example, phr-Tx-PowerFactorChange), the PHR may be triggered.

When case y5 is adopted regarding a certain serving cell, the UE may trigger the PHR when at least one of above conditions z1 to z6 is satisfied. Note that, in case y5, the UE may trigger the PHR when a condition different from above conditions z1 to z6 is satisfied. For example, the UE may compare the current path loss based on actual transmission with the last path loss based on actual transmission and derive path loss variation, regardless of which TRP is indicated for the current/last transmission. When the path loss variation is larger than the threshold (for example, phr-Tx-PowerFactorChange), the PHR may be triggered.

According to the fourth embodiment described above, the UE can preferably trigger PHR transmission for the TRP, based on path loss variation.

Fifth Embodiment

A fifth embodiment relates to a prohibit timer (for example, phr-ProhibitTimer).

Regarding the TRP, the prohibit timer may satisfy at least one of the following:

Embodiment 5.1: One prohibit timer is configured and maintained (or used or applied) for all of the TRPs, Embodiment 5.2: One prohibit timer is configured and maintained (or used or applied) for one TRP.

In a case of Embodiment 5.1, while the prohibit timer is running, the UE may assume that the PHR for any TRP is not triggered. When the prohibit timer expires or has expired, and at least one condition (trigger event) described in the fourth embodiment where path loss variation exceeds the threshold is satisfied, for example, the PHR may be triggered. When the PHR (PHR MAC CE) for any TRP is transmitted, the prohibit timer may restart. According to Embodiment 5.1, a plurality of prohibit timers need not be managed for a plurality of TRPs, and therefore complexity of the UE can be reduced.

Note that, in the present disclosure, "a timer starts (or restarts)" may be interchangeably interpreted as "the MAC entity of the UE starts (or restarts) the timer".

In a case of Embodiment 5.2, different prohibit timers may be respectively configured for two TRPs. For example, a first prohibit timer (phr-ProhibitTimer-1) may be configured for TRP1, and a second prohibit timer (phr-ProhibitTimer-2) may be configured for TRP2. Note that values of these timers may be the same or different. For example, while the prohibit timer for a certain TRP is running, the UE may assume that the PHR for the TRP is not triggered.

In a case of Embodiment 5.2, when at least one condition (trigger event) described in the fourth embodiment where path loss variation exceeds the threshold is satisfied, for example, and one of the following or a combination of these is satisfied, the UE may trigger the PHR:

The first prohibit timer or the second prohibit timer expires or has expired,

Both of the first prohibit timer and the second prohibit timer expire or have expired, The first prohibit timer expires or has expired, The second prohibit timer expires or has expired, The prohibit timer regarding the TRP indicated for the current transmission expires or has expired, The prohibit timer regarding the TRP indicated for the last transmission expires or has expired.

Note that, of these conditions of the prohibit timer (s), the same condition may be applied regarding one or more trigger events described in the fourth embodiment, or different conditions may be applied to different trigger events.

In a case of Embodiment 5.2, when one of the following is satisfied, the prohibit timer for a certain TRP may restart:

The PHR (PHR MAC CE) for any TRP is transmitted,

The PHR for the certain TRP is transmitted,

The actual PHR for the certain TRP is transmitted.

According to Embodiment 5.2, a case in which PHR transmission for a certain TRP prevents PHR transmission for another TRP can be reduced.

Figures 15A, 15B:
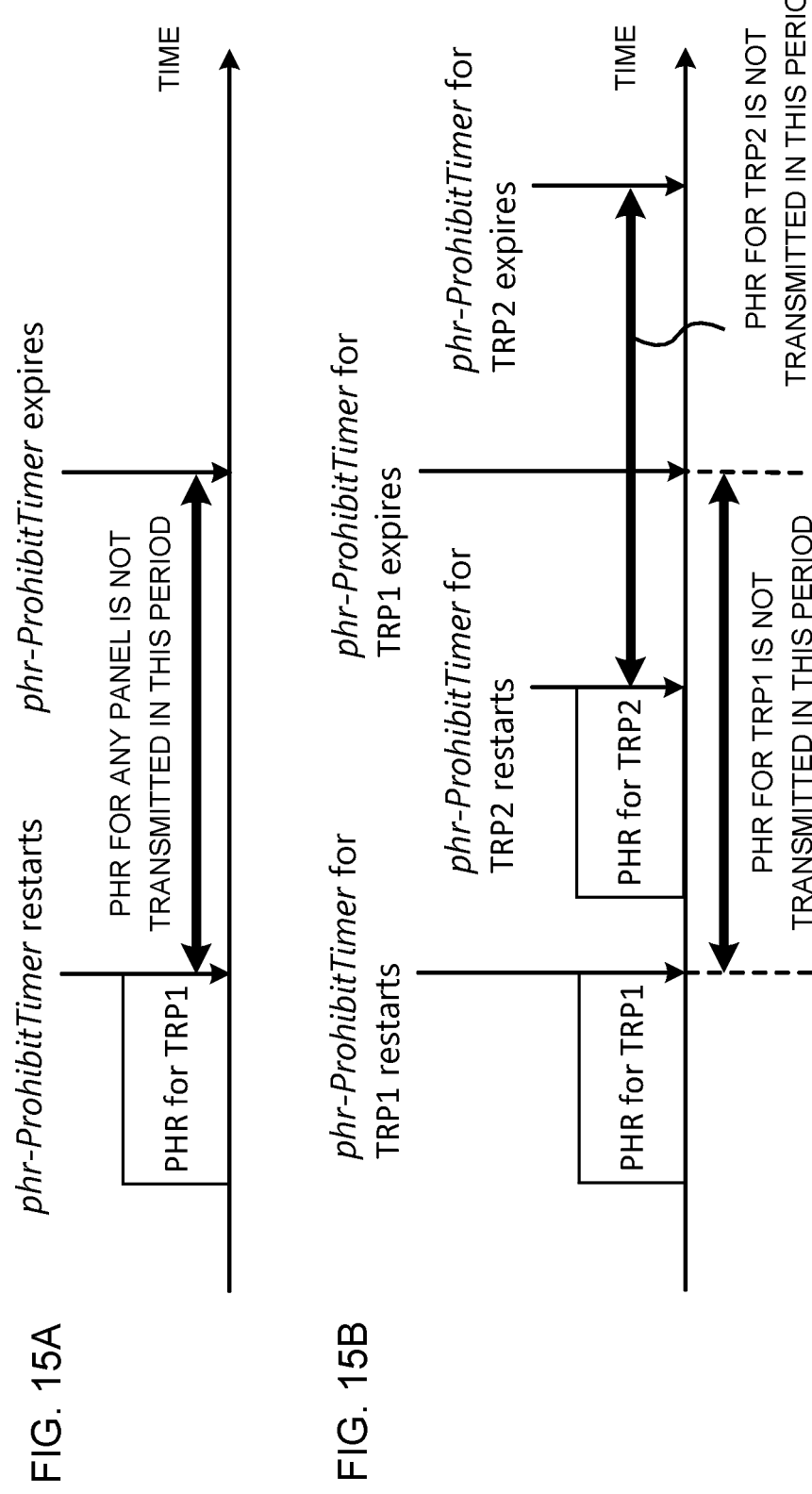
FIGS. 15A and 15B are diagrams to show examples of control related to prohibit timer (s) of a fifth embodiment.

FIGS. 15A and 15B are diagrams to show examples of control related to the prohibit timer (s) of the fifth embodiment. FIGS. 15A and 15B show cases in which the UE uses the prohibit timer (s) of Embodiments 5.1 and 5.2, respectively.

In FIG. 15A, when the PHR for TRP1 is transmitted, the prohibit timer restarts. Until the prohibit timer expires, the PHR for any TRP is not triggered/transmitted.

In FIG. 15B, when the PHR for TRP1 is transmitted, the prohibit timer for TRP1 restarts. Until the prohibit timer expires, the PHR regarding TRP1 is not triggered. Meanwhile, even during the time when the prohibit timer for TRP1 is running, the PHR for TRP2 may be triggered/transmitted.

According to the fifth embodiment described above, the UE can preferably trigger PHR transmission for the TRP, based on the prohibit timer (s).

Sixth Embodiment

A sixth embodiment relates to the number of PHRs to be reported.

Whether or not one or two PHRs are to be reported for each serving cell (or regarding a specific serving cell) may be configured by higher layer signaling (for example, an RRC parameter), may be indicated by physical layer signaling (for example, DCI), may be determined based on a combination of these, or may be determined by the UE based on a condition.

The condition may be which is indicated out of MTRP repetition, STRP repetition, and single transmission, for example. For example, when one of STRP repetition and single transmission is indicated (case 1), the UE may determine to report one PHR, and when MTRP repetition is indicated (case 2), the UE may determine to report two PHRS.

The condition may be whether the PHR to be reported is the actual PHR or the virtual PHR. For example, when the virtual PHR is to be reported, the UE may determine to report one PHR, and when the actual PHR is to be reported, the UE may determine to report two PHRs.

The condition may be according to which embodiment/case of the third embodiment described above the PHR report is controlled.

When it is configured/indicated/determined to report two PHRs for each serving cell (or regarding a specific serving cell), the type of each PHR (that is, whether the PHR is the actual PHR or the virtual PHR) may be configured by higher layer signaling (for example, an RRC parameter), may be indicated by physical layer signaling (for example, DCI), may be determined based on a combination of these, or may be determined by the UE based on a condition.

The condition may be which is indicated out of MTRP repetition, STRP repetition, and single transmission, for example. For example, when one of STRP repetition and single transmission is indicated (case 1), the UE may determine to report the actual PHR for one TRP indicated for (or corresponding to) PUSCH transmission, and may determine to report the virtual PHR for another TRP. The condition may be whether the PHR to be reported is the actual PHR or the virtual PHR.

The condition may be according to which embodiment/case of the third embodiment described above the PHR report is controlled.

Whether or not one or two PHRs are to be reported for each serving cell (or regarding a specific serving cell) may be determined based on a trigger event.

Whether or not one or two PHRs are to be reported for each serving cell (or regarding a specific serving cell) may be determined by the PHR being triggered based on a specific trigger event regarding path loss variation (Embodiment 6.1).

In Embodiment 6.1, for example, when the PHR is triggered by both of path loss variation of PUSCH repetition to TRP1 and path loss variation of PUSCH repetition to TRP2 being larger than their respective thresholds (above condition z2), the UE may report two PHRs regarding the PUSCH for two TRPs.

In Embodiment 6.1, for example, when the PHR is triggered by path loss variation of PUSCH repetition to TRP1 or path loss variation of PUSCH repetition to TRP2 being larger than the threshold (above condition z1), the UE may report two PHRs regarding the PUSCH for two TRPs, or may report one PHR regarding the TRP whose path loss variation is larger than the threshold.

Whether or not one or two PHRs are to be reported for each serving cell (or regarding a specific serving cell) may be determined by the PHR being triggered under a condition of a specific prohibit timer (Embodiment 6.2).

In Embodiment 6.2, for example, when the PHR is triggered when both of the first prohibit timer and the second prohibit timer expire or have expired, the UE may report two PHRs regarding the PUSCH for two TRPs.

In Embodiment 6.2, for example, when the PHR is triggered when the first prohibit timer or the second prohibit timer expires or has expired, the UE may report two PHRs regarding the PUSCH for two TRPs, or may report one PHR regarding the TRP corresponding to the prohibit timer that expires/has expired.

Note that, when reporting of two PHRs is determined according to Embodiment 6.1 and reporting of one PHR is determined according to Embodiment 6.2, or when reporting of one PHR is determined according to Embodiment 6.1 and reporting of two PHRs is determined according to Embodiment 6.2, the UE may follow determination according to Embodiment 6.1, or may follow determination according to Embodiment 6.2.

When reporting of one PHR is determined according to Embodiment 6.1, reporting of one PHR is determined according to Embodiment 6.2, and these PHRs are PHRs for TRPs different from each other, the UE may follow determination according to Embodiment 6.1, may follow determination according to Embodiment 6.2, or may report these two PHRs for two TRPs.

According to the sixth embodiment described above, the UE can appropriately determine how many PHRs are to be reported.

ADDITIONAL NOTES

Note that at least one of the embodiments described above may be applied only to the UE that has reported a specific UE capability or that supports the specific UE capability.

The specific UE capability may indicate at least one of the following:

whether or not PUSCH repetition of the multi-TRP is supported, whether or not the PHR for each TRP is supported, whether or not the actual PHR for each TRP is supported, whether or not the virtual PHR for each TRP is supported, whether or not PHR triggering for each TRP (for example, based on path loss variation) is supported, whether or not the prohibit timer for each TRP is supported.

Note that the specific UE capability may be determined for each serving cell.

At least one of the embodiments described above may be applied when the UE is configured with specific information related to the embodiments described above by higher layer signaling (when not being configured therewith, for example, operations of Rel. 15/16 are applied). For example, the specific information may be information indicating enabling of PUSCH repetition of the multi-TRP, information indicating enabling/configuring of the PHR/actual PHR/virtual PHR/PHR triggering/prohibit timer for each TRP, any RRC parameter for a specific release (for example, Rel. 17), or the like. The UE may be configured with based on which embodiment/case/condition described above the PHR is controlled, using a higher layer parameter.

Note that the embodiments described above may be applied when PUSCH repetition type A/type B is used.

Note that the embodiments described above may be applied when a specific mapping pattern (cyclical, sequential, half-half, or the like) of MTRP repetition is used.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
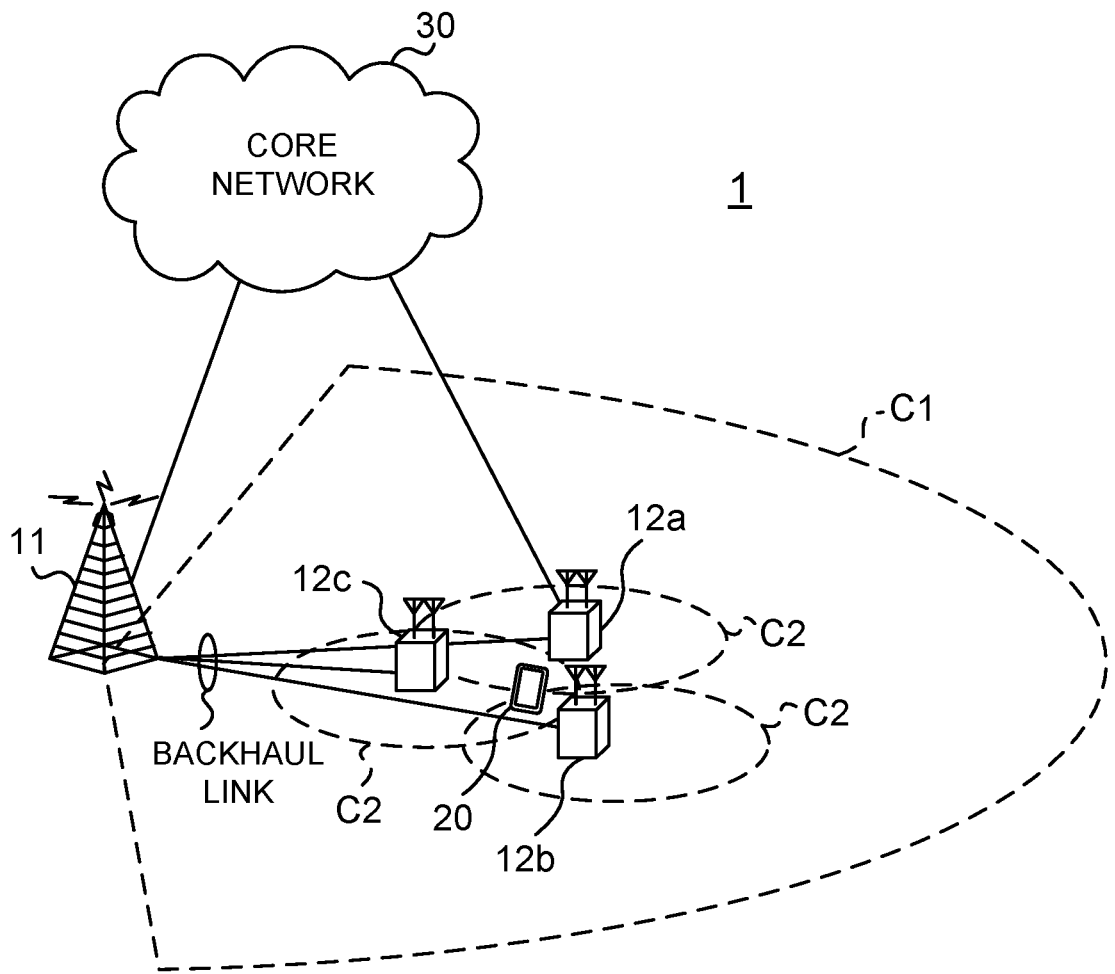
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
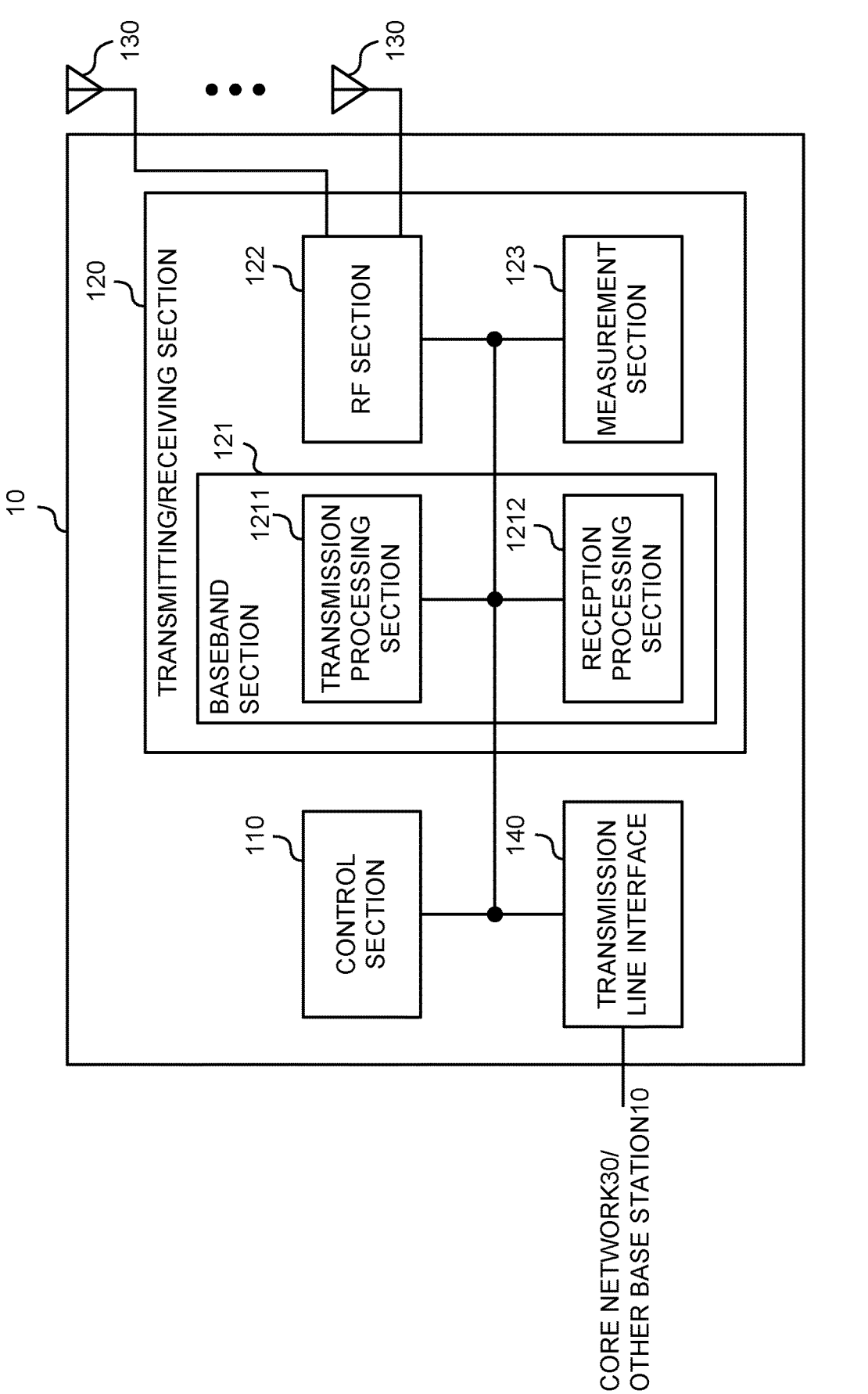
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit downlink control information (DCI) for scheduling Physical Uplink Shared Channel (PUSCH) transmission using one sounding reference signal resource indicator (SRI) regarding a certain serving cell to the user terminal 20.

The transmitting/receiving section 120 may receive a Power Headroom Report (PHR) Medium Access Control (MAC) control element including information indicating whether or not one or two PHRs are to be reported regarding the serving cell.

The transmitting/receiving section 120 may transmit configuration information for transmission of a Power Headroom Report (PHR) Medium Access Control (MAC) control element in a certain serving cell to the user terminal 20. The information may be information of at least one of phr-ProhibitTimer, phr-PeriodicTimer, phr-Tx-PowerFactor-Change, and the like. The information may be included in the configuration information of the PHR.

When transmission of the MAC control element and Physical Uplink Shared Channel (PUSCH) repetition transmission using a plurality of sounding reference signal resource indicators (SRIs) in another serving cell temporally overlap, the transmitting/receiving section 120 may receive the PHR MAC CE including one or two PHRs regarding the other serving cell.

The transmitting/receiving section 120 may receive the PHR MAC control element related to a PHR triggered based on first path loss in last transmission of the PHR and second path loss in current new uplink transmission regarding the serving cell, the first path loss and the second path loss being calculated by determining whether the first path loss and the second path loss are based on Physical Uplink Shared Channel (PUSCH) transmission using one sounding reference signal resource indicator (SRI), based on PUSCH repetition transmission using a plurality of SRIs, or based on reference PUSCH transmission.

(User Terminal)

Figure 18:
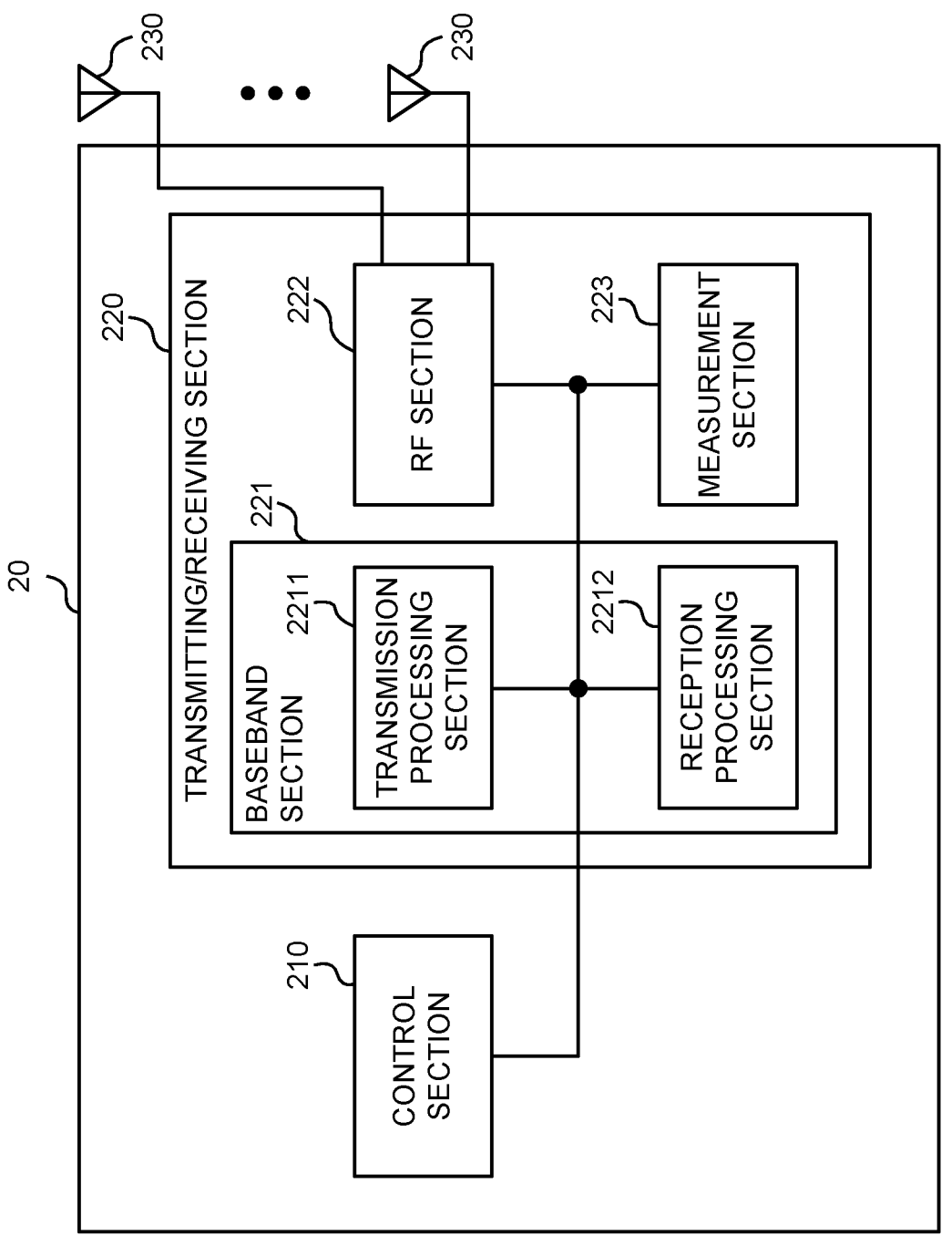
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may perform Physical Uplink Shared Channel (PUSCH) transmission using one sounding reference signal resource indicator (SRI) regarding a certain serving cell.

The control section 210 may generate a Power Headroom Report (PHR) Medium Access Control (MAC) control element including information indicating whether or not one or two PHRs are to be reported regarding the serving cell.

When transmission of a Power Headroom Report (PHR) Medium Access Control (MAC) control element in a certain serving cell and Physical Uplink Shared Channel (PUSCH) repetition transmission using a plurality of sounding reference signal resource indicators (SRIs) in another serving cell temporally overlap, the control section 210 may determine one or two PHRs regarding the other serving cell to be included in the PHR MAC control element.

The transmitting/receiving section 220 may transmit the PHR MAC control element.

Regarding a certain serving cell, the control section 210 may determine whether first path loss in last transmission of a Power Headroom Report (PHR) and second path loss in current new uplink transmission are based on Physical Uplink Shared Channel (PUSCH) transmission using one sounding reference signal resource indicator (SRI), based on PUSCH repetition transmission using a plurality of SRIs, or based on reference PUSCH transmission, and calculate the first path loss and the second path loss.

The transmitting/receiving section 220 may transmit a PHR Medium Access Control (MAC) control element related to the PHR triggered based on the first path loss and the second path loss.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
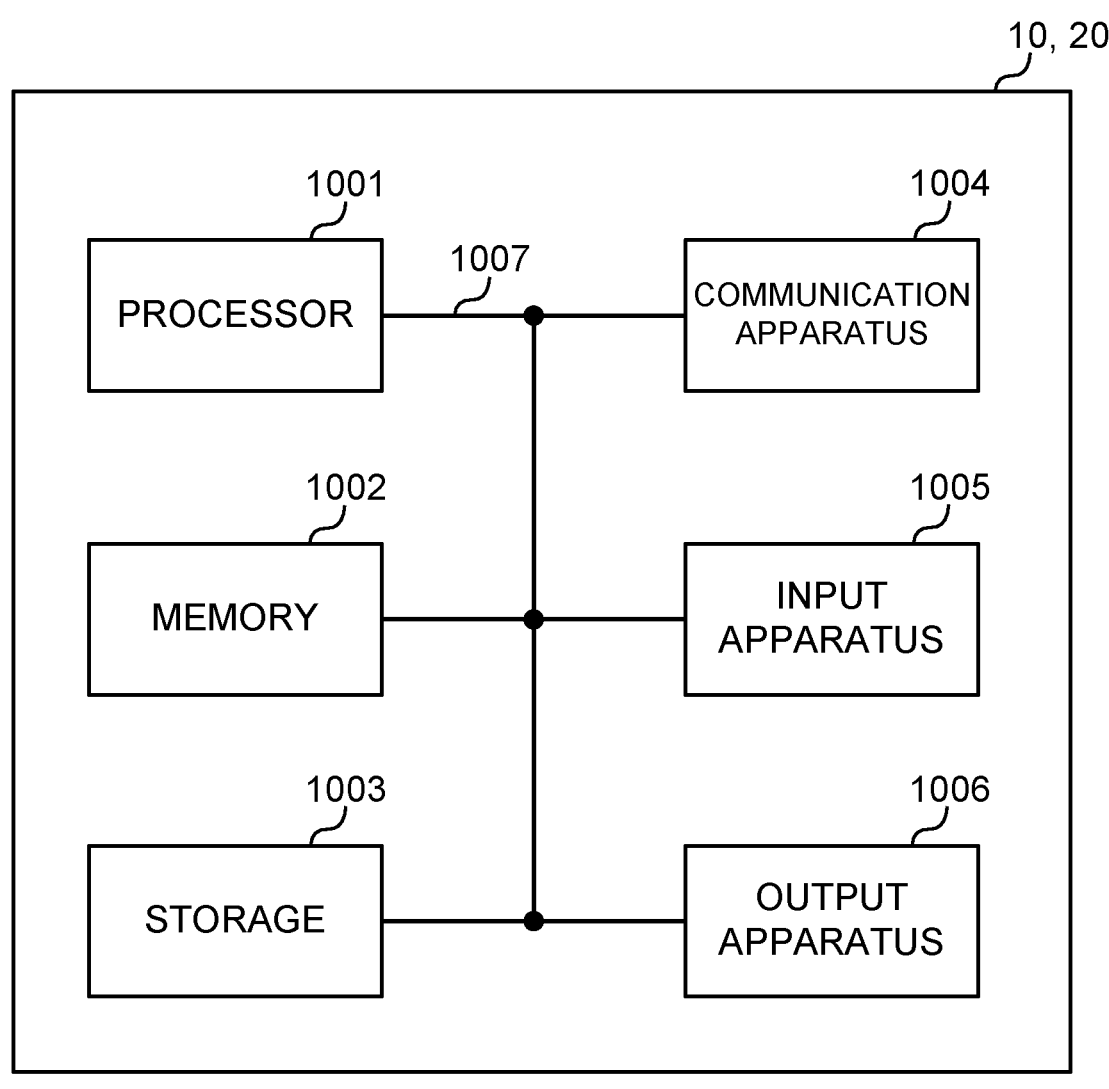
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IOT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives a higher layer parameter indicating enabling of a first power headroom report (PHR) corresponding to a first transmission/reception point (TRP) and a second PHR corresponding to a second TRP, and downlink control information (DCI);
a processor that, when a physical uplink shared channel (PUSCH) transmission to the first TRP and the second TRP is not indicated by the DCI, calculates the first PHR based on a first reference PUSCH transmission for the first TRP, and calculates the second PHR based on a second reference PUSCH transmission for the second TRP; and
a transmitter that transmits a medium access control (MAC) control element including a field indicating the first PHR and a field indicating the second PHR.

2. The terminal according to claim 1, wherein a plurality of default power control parameters for calculating the first PHR are different from a plurality of default power control parameters for calculating the second PHR.

3. A radio communication method for a terminal, comprising:
receiving a higher layer parameter indicating enabling of a first power headroom report (PHR) corresponding to a first transmission/reception point (TRP) and a second PHR corresponding to a second TRP, and downlink control information (DCI);
when a physical uplink shared channel (PUSCH) transmission to the first TRP and the second TRP is not indicated by the DCI, calculating the first PHR based on a first reference PUSCH transmission for the first TRP, and calculating the second PHR based on a second reference PUSCH transmission for the second TRP; and transmitting a medium access control (MAC) control element including a field indicating the first PHR and a field indicating the second PHR.

4. A base station comprising:
a transmitter that transmits a higher layer parameter indicating enabling of a first power headroom report (PHR) corresponding to a first transmission/reception point (TRP) and a second PHR corresponding to a second TRP, and downlink control information (DCI);
a processor that, when the DCI does not indicate a physical uplink shared channel (PUSCH) transmission to the first TRP and the second TRP, determines that a terminal calculates the first PHR based on a first reference PUSCH transmission for the first TRP, and calculates the second PHR based on a second reference PUSCH transmission for the second TRP; and
a receiver that receives a medium access control (MAC) control element including a field indicating the first PHR and a field indicating the second PHR.

5. A system comprising a terminal and a base station, wherein the terminal comprises:
a receiver that receives a higher layer parameter indicating enabling of a first power headroom report (PHR) corresponding to a first transmission/reception point (TRP) and a second PHR corresponding to a second TRP, and downlink control information (DCI);
a processor that, when a physical uplink shared channel (PUSCH) transmission to the first TRP and the second TRP is not indicated by the DCI, calculates the first PHR based on a first reference PUSCH transmission for the first TRP, and calculates the second PHR based on a second reference PUSCH transmission for the second TRP; and
a transmitter that transmits a medium access control (MAC) control element including a field indicating the first PHR and a field indicating the second PHR, and
the base station comprises:
a receiver that receives the MAC control element.

* * * * *